United States Patent
Shibuya et al.

(10) Patent No.: US 10,412,258 B2
(45) Date of Patent: Sep. 10, 2019

(54) IMAGE FORMING APPARATUS

(71) Applicant: CANON KABUSHIKI KAISHA, Tokyo (JP)

(72) Inventors: Yuichiro Shibuya, Abiko (JP); Taku Shinohara, Saitama (JP); Yasuhiro Takahashi, Abiko (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/787,348

(22) Filed: Oct. 18, 2017

(65) Prior Publication Data

US 2018/0115676 A1  Apr. 26, 2018

(30) Foreign Application Priority Data

Oct. 24, 2016 (JP) .................................. 2016-207659

(51) Int. Cl.
*H04N 1/23* (2006.01)
*H04N 1/00* (2006.01)

(52) U.S. Cl.
CPC ....... *H04N 1/2323* (2013.01); *H04N 1/00482* (2013.01); *H04N 1/2369* (2013.01); *H04N 2201/0081* (2013.01); *H04N 2201/0082* (2013.01)

(58) Field of Classification Search
None
See application file for complete search history.

(56) References Cited

U.S. PATENT DOCUMENTS

| | | | |
|---|---|---|---|
| 6,816,271 B1 | 11/2004 | Takahashi | |
| 7,057,748 B2 | 6/2006 | Takahashi | |
| 9,415,613 B2 | 8/2016 | Inui et al. | |
| 2002/0051182 A1* | 5/2002 | Sommer | H04N 1/00408 358/1.15 |
| 2015/0055175 A1 | 2/2015 | Iida | |
| 2016/0004939 A1* | 1/2016 | Inoue | G06K 15/1809 358/1.12 |

FOREIGN PATENT DOCUMENTS

| | | |
|---|---|---|
| JP | 2007-126293 A | 5/2007 |
| JP | 2008-023808 A | 2/2008 |

OTHER PUBLICATIONS

Taku Shinohara et al., U.S. Appl. No. 15/730,114, filed Oct. 11, 2017.
Yasuhiro Takahashi, U.S. Appl. No. 15/712,590, filed Sep. 22, 2017.

* cited by examiner

*Primary Examiner* — Frantz Bataille
(74) *Attorney, Agent, or Firm* — Venable LLP

(57) ABSTRACT

An image forming apparatus includes a processor to execute one of a plurality of modes. In a first mode the processor controls an image forming portion to form an image on the sheet only if a sheet type included in an image forming job is consistent with the sheet type stored in a storage portion, and in a second mode the processor controls image formation even if the sheet type is inconsistent with the stored sheet type. In a third mode the processor displays the type setting screen on the display at a time when the sheet is supported on the sheet support portion. In a condition in which the processor is set in the third mode, the display is controlled so as not to display the type setting screen at the time the sheet is supported on the sheet support portion in the second mode.

5 Claims, 23 Drawing Sheets

IMAGE FORMING APPARATUS

BACKGROUND OF THE INVENTION

Field of the Invention

The present disclosure relates to an image forming apparatus configured to form an image on a sheet.

Description of the Related Art

An image forming apparatus includes a feed cassette and a manual feed tray as a sheet support portion configured to support a sheet, i.e., a recording medium. Attributes such as a sheet size and a sheet type of the sheet stacked in the sheet support portion are recognized by a control unit of the image forming apparatus through a setting operation made by a user through an operating portion of the image forming apparatus for example. Then, in a case where an image forming job is inputted, the image forming job is executed normally after determining whether sheet attribute information specified by the image forming job conforms to sheet attribute information set for the sheet support portion.

An image forming apparatus is known to be configured to perform different printing operations corresponding to a sheet placed on the sheet support portion. Specifically, the image forming apparatus rotates an orientation of an image to be printed corresponding to a size and orientation of the sheet and changes fixing temperature, fixing pressure and a sheet conveyance speed in fixing the image corresponding to the sheet type for example.

U.S. Pat. No. 9,415,613 discloses an image forming apparatus which enables to omit re-setting of sheet information such as a sheet size in a case where sheets on a manual feed tray run short while executing an image forming job. This image forming apparatus is configured to relieve an operational burden of a user such that the user is not required to set the sheet information again in replenishing an insufficient sheet.

By the way, the image forming job includes a PDL job described in Page Description Language (referred to as a 'PDL' hereinafter) and transmitted from a host computer to the image forming apparatus. The PDL job includes sheet attribute information such as a sheet type. Then, it is conceivable to provide a mode of executing the job by preferentially using the sheet attribute information contained in the PDL job.

Then, an image forming apparatus configured to execute an image forming operation adequately on a sheet while relieving the operational burden of the user in such mode is demanded.

SUMMARY OF THE INVENTION

According to a first aspect of the present invention, an image forming apparatus includes a sheet support portion configured to support a sheet, an image forming portion configured to form an image on the sheet fed from the sheet support portion, a display configured to display an attribute setting screen on which a sheet attribute corresponding to the sheet support portion can be set, a storage portion configured to store information concerning the sheet attribute corresponding to the sheet support portion, and a processor configured to execute one of plurality of modes including a first mode and a second mode in a case where an image forming job is inputted, and configured to execute one of plurality of modes including a third mode and a fourth mode, the first mode being a mode where the processor controls the image forming portion to form an image on the sheet only if a sheet attribute included in the image forming job is consistent with the sheet attribute stored in the storage portion, the second mode being a mode where the processor is capable of controlling the image forming portion to form the image on the sheet even if the sheet attribute included in the image forming job is inconsistent with the sheet attribute stored in the storage portion, the third mode being a mode where the processor displays the attribute setting screen on the display based on that the sheet is supported on the sheet support portion, the fourth mode being a mode where the processor does not display the attribute setting screen on the display even if the sheet is supported on the sheet support portion. The processor controls, in a condition in which the processor is set in the third mode, the display so as to display the attribute setting screen based on that the sheet is supported on the sheet support portion in the first mode and controls the display so as not to display the attribute setting screen even if the sheet is supported on the sheet support portion in the second mode.

According to a second aspect of the present invention, an image forming apparatus includes a sheet support portion configured to support a sheet, an image forming portion configured to form an image on the sheet fed from the sheet support portion, a storage portion configured to store information concerning a sheet attribute corresponding to the sheet support portion, a display configured to display an attribute setting screen on which the sheet attribute corresponding to the sheet support portion can be set and configured to set the sheet attribute corresponding to the sheet support portion through a selection operation made on the attribute setting screen, and a processor configured to execute one of plurality of modes including a first mode and a second mode in a case where an image forming job is inputted, and configured to execute one of plurality of modes including a third mode and a fourth mode, the first mode being a mode where the processor controls the image forming portion to form an image on the sheet only if an attribute of the sheet included in the image forming job is consistent with the attribute of the sheet stored in the storage portion, the second mode being a mode where the processor is capable of controlling the image forming portion to form the image on the sheet even if the attribute of the sheet included in the image forming job is inconsistent with the attribute of the sheet stored in the storage portion, the third mode being a mode where the processor displays the attribute setting screen on the display based on that the sheet is supported on the sheet support portion, the fourth mode being a mode where the processor does not display the attribute setting screen on the display even if the sheet is supported on the sheet support portion. The processor controls, in a condition in which the processor is set in the second and third modes, the image forming portion so as to form the image on the sheet in a case where an image forming job including a sheet attribute is inputted even if no selective operation is made on the display.

According to a third aspect of the present invention, an image forming apparatus includes a sheet supporting unit including a plurality of sheet support portions each configured to support a sheet, an image forming portion configured to form an image on the sheet fed from the sheet supporting unit, a read portion configured to read image information of a sheet, a storage portion configured to store information concerning sheet types corresponding to the respective sheet support portions, a display configured to display a selection screen which enables to select one of the sheet support portions as a sheet supply source used in a copy job of forming an image based on the image information read by the read portion, and a processor configured to execute one of plurality of modes including a fifth mode and a sixth mode in a case where the copy job is inputted, the fifth mode being a mode where the processor controls the image forming portion to form an image on the sheet only if a sheet type included in the copy job is consistent with the sheet type stored in the storage portion, the sixth mode being a mode where the processor is capable of controlling the image forming portion to form the image on the sheet even if the sheet type included in the copy job is inconsistent with the sheet type stored in the storage portion. The processor displays, in a case where the selective screen is displayed, a first image permitting to select one from all of the sheet support portions as the sheet supply source on the display in a condition in which the fifth mode is set on all of the plurality of sheet support portions, and displays a second image which disables to select the sheet support portion set in the sixth mode as a sheet supply source on the display in a condition in which the sixth mode is set at least on one of the plurality of sheet support portions.

According to a fourth aspect of the present invention, an image forming apparatus includes a sheet supporting unit including a plurality of sheet support portions each configured to support a sheet, an image forming portion configured to form on the sheet fed from the sheet supporting unit, a read portion configured to read image information of a sheet, a storage portion configured to store information concerning sheet types corresponding to the respective sheet support portions and a sheet supply source, and a processor configured to execute one of plurality of modes including a fifth mode and a sixth mode in a case where a copy job of forming an image based on the image information read by the read portion is inputted, the fifth mode being a mode where the processor controls the image forming portion to form an image on the sheet only if a sheet type included in the copy job is consistent with the sheet type stored in the storage portion corresponding to the sheet supply source, the sixth mode being a mode where the processor is capable of controlling the image forming portion to form the image on the sheet even if the sheet type included in the copy job is inconsistent with the sheet type stored in the storage portion corresponding to the sheet supply source. The processor is configured to execute an image forming operation to a sheet supported on the sheet support portion which is set in the fifth mode and configured not to execute the image forming operation to a sheet supported on the sheet support portion which is set in the sixth mode in a case where a copy job in which no sheet supply source is specified is inputted.

According to a fifth aspect of the present invention, an image forming apparatus includes a sheet supporting unit including a plurality of sheet support portions each configured to support a sheet, an image forming portion configured to form on the sheet fed from the sheet supporting unit, a read portion configured to read image information of a sheet, a display configured to display an attribute setting screen by which a sheet type corresponding to the sheet support portion can be set , a storage portion configured to store information concerning sheet types respectively corresponding to the sheet support portions and a sheet supply source, and a processor configured to execute one of plurality of modes including a fifth mode and a sixth mode in a case where a copy job of forming an image based on the image information read by the read portion is inputted, the fifth mode being a mode where the processor controls the image forming portion to form an image on the sheet only if a sheet type included in the copy job is consistent with the sheet type stored in the storage portion corresponding to the sheet supply source, the sixth mode being a mode where the processor is capable of controlling the image forming portion to form the image on the sheet even if the sheet type included in the copy job is inconsistent with the sheet type stored in the storage portion corresponding to the sheet supply source. The processor is configured to display the attribute setting screen on the display in a case where a copy job in which the sheet support portion set in the sixth mode is specified as the sheet supply source is inputted.

Further features of the present invention will become apparent from the following description of exemplary embodiments with reference to the attached drawings.

DESCRIPTION OF THE EMBODIMENTS

First Embodiment

Figure 1:
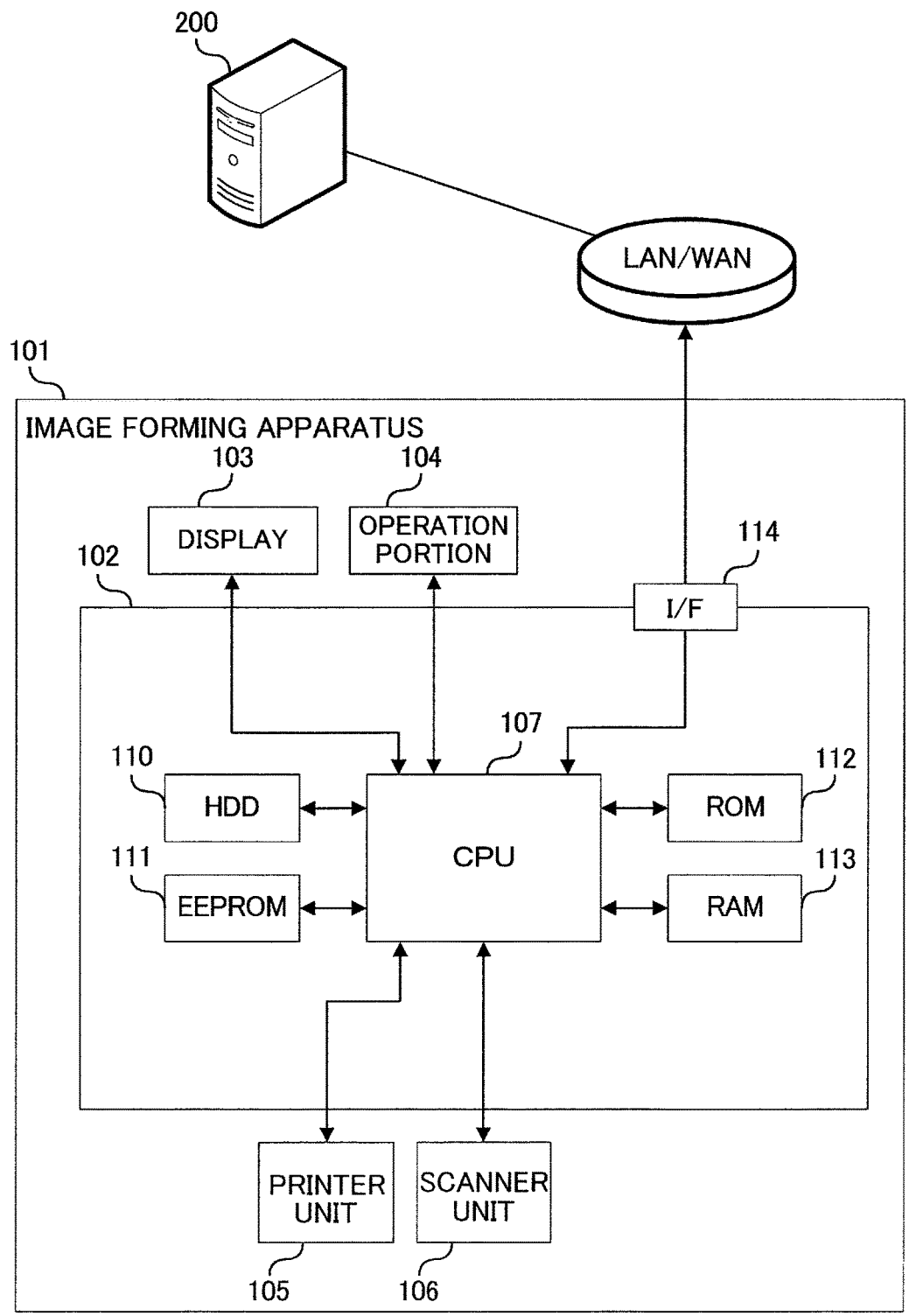
FIG. 1 is a block diagram illustrating an overall configuration of an image forming system of a first embodiment.

An image forming apparatus of the present disclosure will be described below with reference to the drawings. FIG. 1 illustrates a schematic configuration of a system including an image forming apparatus 101 of the present embodiment. The image forming apparatus 101 comprises a function unit including a printer unit 105 and a scanner unit 106, and a display 103 and an operation portion 104 which are user interfaces. The image forming apparatus 101 also comprises a control unit 102 configured to control these devices.

The display 103 includes an LED as a display lamp and a liquid crystal display and displays a result of an operation made by a user and an internal condition of the apparatus based on a signal from the control unit 102. The operation portion 104 includes a hard key group and a control structure realizing touch panel functions of the display 103. The operation portion 104 receives an operation of the user and transmits it to the control unit 102 as an electronic signal. That is, the operation portion 104 is configured to allow various information on attributes of a sheet described later to be inputted.

The scanner unit 106 serving as a read portion is configured to scan a document based on an instruction made by the control unit 102 to read image data and to transmit the obtained image data to the control unit 102. The printer unit 105 is configured to execute an image forming operation, i.e., a printing operation, by receiving the instruction of the control unit 102.

The control unit 102 is composed of a control circuit including a CPU 107, a HDD 110, an EEPROM 111, a ROM 112, and a RAM 113. Here, the CPU is an abbreviation of a central processing unit, the ROM is that of a read only memory, the HDD is that of a hard disk drive, and the EEPROM represents an electrically rewritable nonvolatile memory.

The CPU 107, i.e., a processor, is an execution medium of a control program stored in the ROM 112 and others and is configured to control mechanical and electrical operations of the devices connected to the control unit 102. For instance, the CPU 107 causes the printer unit 105 to carry out an image forming operation to execute an image forming job. Here, the image forming job is a task of the image forming operation to be executed by the control unit 102 and specifically refers to a data stream including image data of each page, a number of copies, a size and a type of a sheet, setting of a function such as duplex printing and stapling, and others. The image forming job includes a copy job, generated by the control unit 102, based on image data obtained by the scanner unit 106 and a PDL job inputted from an outside and described later.

The ROM 112 is configured to store a boot program and others needed for starting the system, and the RAM 113, i.e., a volatile memory, is used as a work memory in executing a control program. The HDD 110 is storage medium such as a magnetic disk and stores the control program, image data, and others. The EEPROM 111 stores setting values needed in executing the control program.

The CPU 107 is one exemplary controller configured to control the image forming apparatus 101. It is noted that each processing step of the following flowcharts illustrating processes for controlling the image forming apparatus 101 will be executed by the CPU 107 unless specified otherwise. All of the ROM 112, the RAM 113, the HDD 110 and the EEPROM 111 are also exemplary storage portions capable of temporarily or permanently storing information based on an instruction of the controller. The EEPROM 111 stores information, e.g., a sheet size, a sheet type and a type-free setting, concerning each sheet support portion described later.

The CPU 107 is connected with a local or wide area network (LAN/WAN) through the network interface (I/F) 114 serving as a transmission/receiving device. Thereby, the control unit 102 can transmit/receive data with a host computer such as a personal computer (PC) 200. For instance, the CPU 107 receives an image forming job (referred to as a 'PDL job' hereinafter) described in a Page Description Language: PDL) from the PC 200. The CPU 107 also transmits an internal state of the image forming apparatus 101 such as progress of the image forming job and a remaining amount of sheets to the host computer.

Hardware Structure of Image Forming Apparatus

Figure 2A:
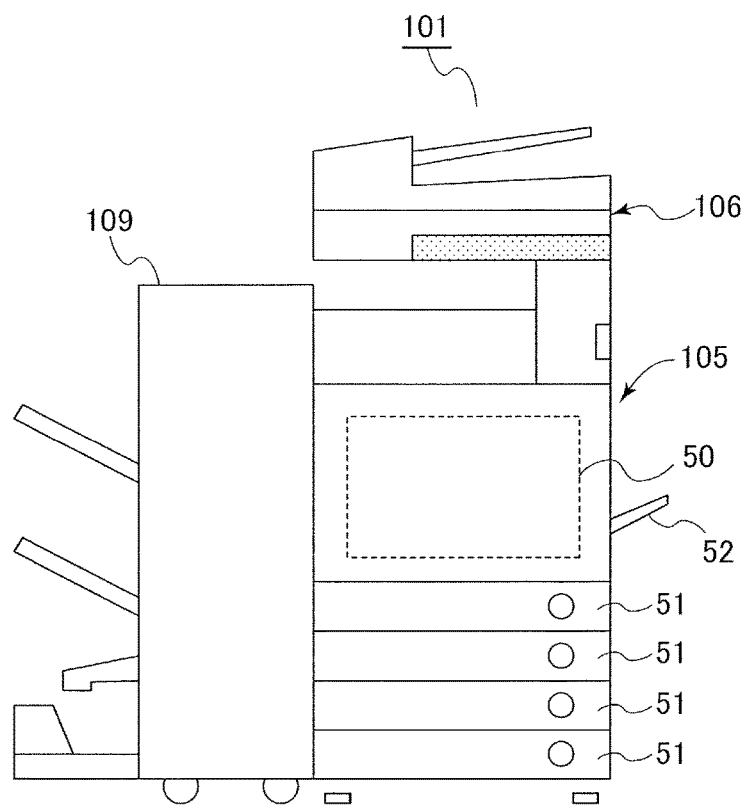
FIG. 2A is a front view illustrating an appearance of an image forming apparatus.

Next, a hardware structure of the image forming apparatus 101 will be described with reference to FIGS. 2A through 2C. As illustrated in FIG. 2A, the printer unit 105 of the image forming apparatus 101 includes an image forming engine 50 disposed within the apparatus body (housing) and a plurality of sheet support portions 51 and configured to support the sheet, i.e., the recording medium. Here, the sheet includes, besides a plain sheet, a special sheet such as a coated sheet, a recording medium having a specific shape such as an envelope and an index sheet, a plastic film for an overhead projector, and a cloth. It is noted that while a term 'sheet' is often used in the following description and in the drawings, it is handled as an acronym of the sheet including a material other that a sheet of paper unless otherwise specified.

Figure 2B:
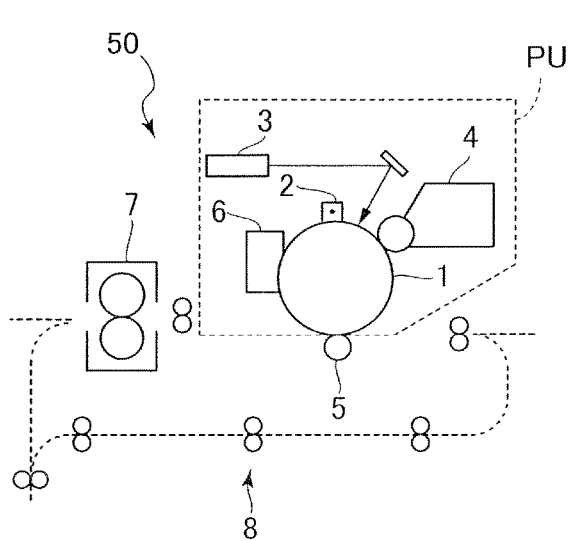
FIG. 2B is a schematic diagram illustrating a configuration of an image forming engine.

As illustrated in FIG. 2B, the image forming engine 50 of the present embodiment includes an electro-photographic image forming unit PU and a fixing unit 7. When an instruction of starting the image forming operation is given, a photosensitive drum 1, i.e., a photosensitive body, rotates and a surface of the drum is uniformly electrified by an electrifying unit 2. Then, an exposure unit 3 modulates and outputs a laser beam based on image data transmitted from the control unit 102 and scans the surface of the photosensitive drum 1 to form an electrostatic latent image. This electrostatic latent image is visualized, i.e., developed, as a toner image by toner supplied from a developing unit 4.

In parallel with such image forming operation, a feed operation is executed to feed a sheet supported by either one of the sheet support portions 51 and 52 to the image forming engine 50. As illustrated in FIG. 2A, the sheet support portions includes a plurality of sheet feed cassettes 51 attached drawably from the housing of the printer unit 105 and the manual feed tray 52 disposed on a side surface of the housing. These will be referred to as a sheet supporting unit hereinafter.

The CPU 107 recognizes sheet attribute information concerning sheet attributes stacked in each of the feed cassette 51 and 52 based on an operation made by the user through the operation portion 104. Here, the sheet attribute is a generic name of characteristics of the sheet such as a sheet size including an orientation of the sheet, a type of the sheet such as a basis weight, whether a surface is treated, a material of the sheet, a shape such as if the sheet is an index sheet and a loose leaf, and a special use such as an envelope. The CPU 107 stores the sheet attribute information inputted directly by the user and the sheet attribute information such as the size and type obtained through detection mechanisms disposed respectively in the feed cassette 51 and the manual feed tray 52 in the EEPROM 111.

It is noted that the sheet attribute information is stored in the EEPROM 111 by being associated respectively with the feed cassette 51 and the manual feed tray 52. Still further, it is also possible to configure such that the size and the type of the sheet stacked in the feed cassette 51 are automatically detected. Still further, it is unable to set size-free or type-free described later for the feed cassette 51 and specific size and type must be always set for the feed cassette 51. Setting of the size and type of the sheet stacked on the manual feed tray 52 will be described later.

Figure 2C:
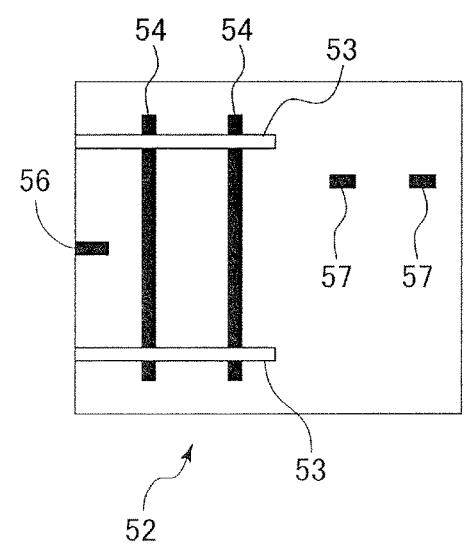
FIG. 2C is a schematic diagram illustrating a configuration of a manual feed tray.

As illustrated in FIG. 2C, the manual feed tray 52 is provided with a sheet detection sensor 56, a pair of side guides 53, guide width sensors 54, and length detection sensors 57. The sheet detection sensor 56 is disposed at a downstream end of the manual feed tray 52 in a sheet feed direction (left direction in FIG. 2C and emits a detection signal when the sheet detection sensor 56 detects a sheet placed on the tray. The side guides 53 are movable along rails extending in a width direction orthogonal to the sheet feed direction, and widthwise positions thereof are detected by the guide width sensors 54. The length detection sensors 57 are disposed at least at one place in the sheet feed direction to detect whether there is a sheet at a preset position. These configurations make it possible for the CPU 107 to obtain information concerning the size of the sheet placed on the manual feed tray 52 based on detection signals from the guide width sensors 54 and the length detection sensors 57 which are one example of a size detection portion. It is possible to automatically determine all regular size sheets by combinations of the detection signals from the guide width sensors 54 and the length detection sensors 57. It is noted that although the manual feed tray 52 is not provided with a sensor for detecting the sheet type such as a plain sheet and a thick sheet in the present embodiment, the manual feed tray 52 may be provided with such sensor in a condition in which an operation is halted.

As illustrated in FIGS. 2A and 2B, the sheet placed on the feed cassette 51 or the manual feed tray 52 is fed in a condition in which the sheet is separated one by one by a feed unit provided with a separation mechanism such as a retard roller type. A skew of the sheet supplied to the image forming engine 50 is corrected by a registration portion and is conveyed in synchronism with an advance of the image forming operation of the image forming unit PU. Then, a transfer unit 5 disposed in the image forming engine 50 transfers the toner image borne on the photosensitive drum 1 onto the sheet. The sheet onto which the unfixed toner image has been transferred is passed to the fixing unit 7 and is heated and pressurized by being nipped by a roller pair. Thereby, the toner melts and is fixed to the sheet, and the sheet onto which the image has been fixed is discharged by a discharge portion such as a discharge roller pair. It is noted that as illustrated in FIG. 2A, the image forming apparatus 101 may be connected with a finisher 109 as an option on a side thereof. The finisher 109 implements a process such as stapling on the sheet on which the image has been formed and discharges the sheet.

While the electro-photographic type image forming engine 50 has been described as one example of an image forming portion in the present embodiment, another mechanism such as ink-jet type mechanism may be used as the image forming engine. It is also possible to use a configuration different from the image forming engine 50 described above also in the case of the electro-photographic type such as an image forming engine configured to be able to form a color image such as a tandem-type intermediate transfer type engine. Setting of Type-free.

Here, a 'type-free' setting process that can be set on the manual feed tray 52 will be described. As described above, the information concerning the sheet type corresponding to the feed cassette 51 and the manual feed tray 52 is stored in the EEPROM 111. Meanwhile, the PDL job received from the external host computer often includes information specifying the sheet support portion, i.e., the sheet supply source, and information specifying the sheet type. In general, in a case when the PDL job is inputted, a sheet type specified by the PDL job is required to be coincident with the sheet type corresponding to the sheet support portion specified by the PDL job as a prerequisite for starting a printing operation.

In this case, however, the user is required to make both operations of setting the sheet type through a driver software and of setting the sheet type through the operation portion of the image forming apparatus. Still further, in a case where printing is to be executed while frequently changing a plurality of types of sheets, the user needs to set the sheet type on the both sides of the image forming apparatus and the host PC every time when the user changes the sheets, thus increasing an operational burden of the user. In particular, the operation portion of the image forming apparatus is often insufficient in terms of a screen size and responsibility to the operation, and it takes a time to find a desirable type on a sheet setting screen in a case where a number of printable sheet types are several tens or more.

Then, the present embodiment is provided with setting of 'type-free' which enables to execute the image forming operation corresponding to the sheet type specified by the PDL job regardless of the sheet type stored in the EEPROM 111 and corresponding to the manual feed tray 52. The type-free setting is an omission setting that enables to omit an input of information concerning the sheet type made by the user through the operation portion 104. Therefore, it is not necessary to select a specific type out of a large number of candidates as setting on the side of the manual feed tray 52. It is thus possible to execute a printing operation on a plurality of types of sheets just by a simple operation of setting the 'type-free'.

Figure 10:
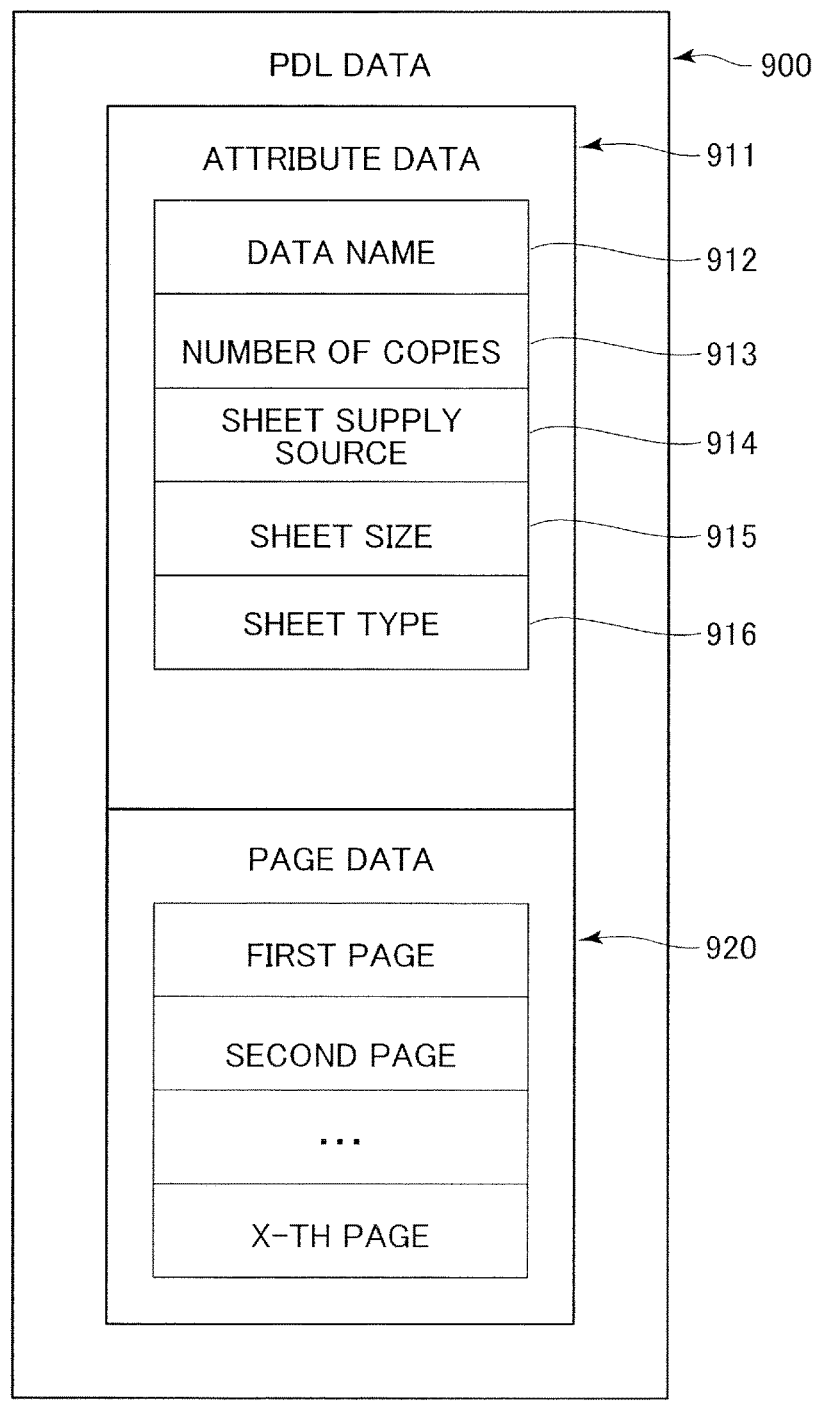
FIG. 10 is conceptual diagram illustrating contents of a PDL data transmitted/received as a PDL job.

The 'type-free' setting is one example of a second mode or a sixth mode that enables to form an image on a sheet by the image forming engine 50 even in a case where information concerning the sheet attribute contained in the image forming job such as a PDL job and a copy job does not conform with information stored in the EEPROM 111. Besides the type-free, the second mode or sixth mode includes a 'size-free' setting that enables to form an image on a sheet by the image forming engine 50 even in a case where information concerning a sheet size contained in the image forming job does not conform with a sheet size stored in the EEPROM 111 and a 'driver setting priority' of forming an image by setting specified by the PDL job while ignoring the printer-side setting. The sheet attribute includes at least one of the size and the type of the sheet and includes a data name, a number of copies, a sheet supply source, the sheet size, and the sheet type as illustrated in FIG. 10 for example. A first mode or a fifth mode in a mode of forming an image on a sheet under a prerequisite that no second mode or sixth mode such as the 'type-free' is set and that the information concerning the sheet attribute contained in the image forming job conforms to the information stored in the EEPROM 111.

It is noted that while the present embodiment is configured such that the type-free setting is applied only to the manual feed tray 52, it is also possible to arrange such that the type-free setting is applicable to the other sheet support portion such as the feed cassette 51. Still further, while the present embodiment is configured such that enable and disable of the type-free setting is switched by an operation made by using the operation portion 104, it is also possible to arrange such that such setting can be made on the host computer side through driver software.

Figure 3:
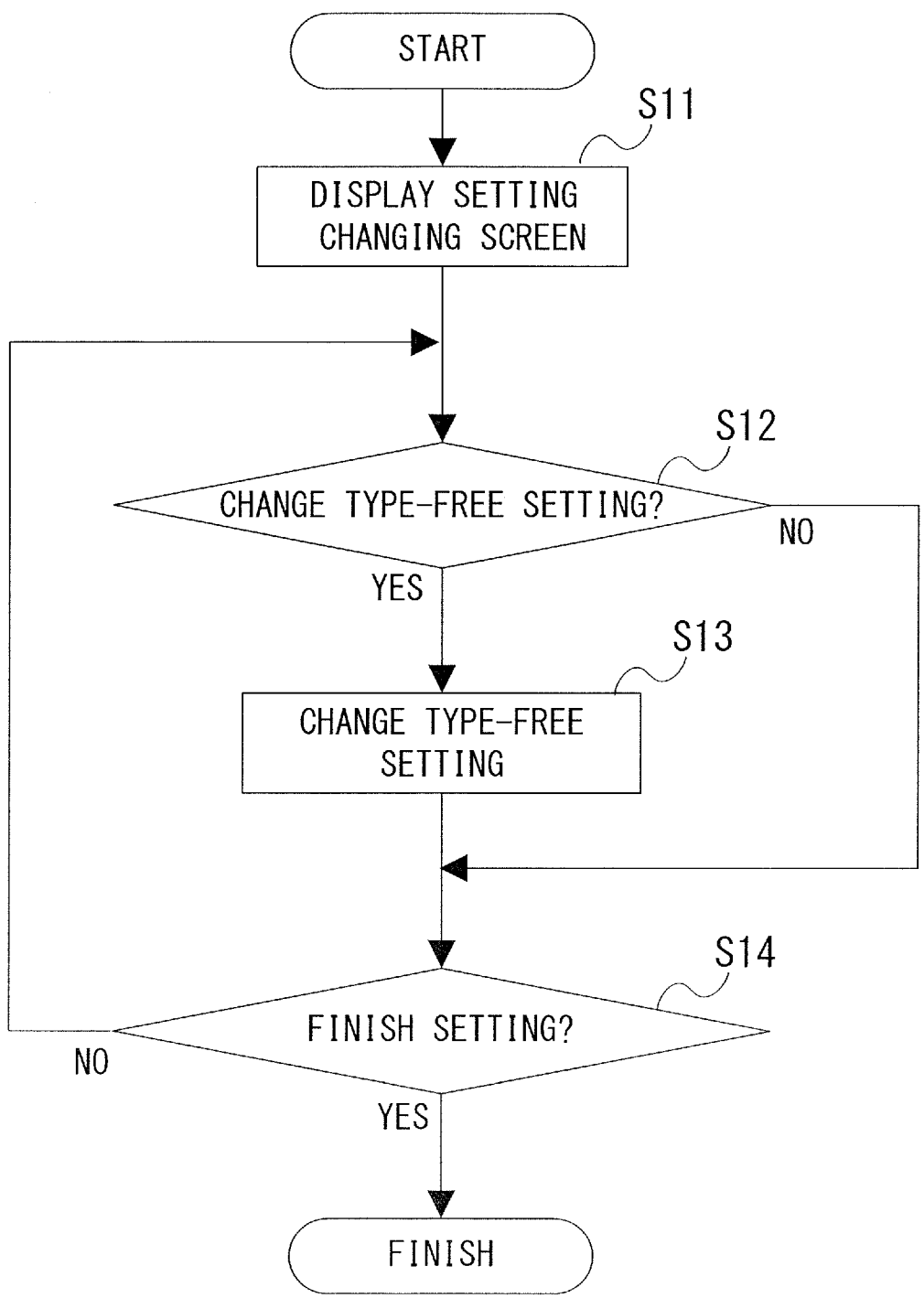
FIG. 3 is a flowchart illustrating a procedure of a type-free setting changing process.
Figure 4:
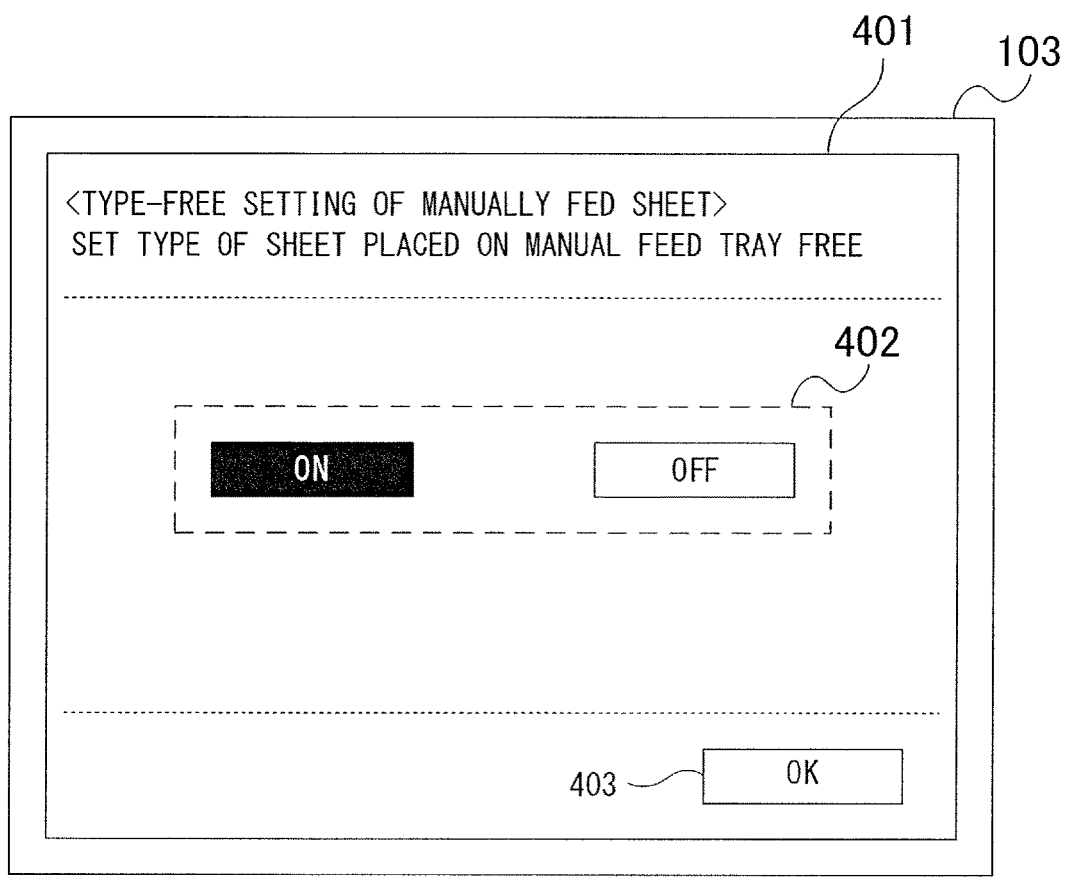
FIG. 4 is an image illustrating a type-free setting changing screen.

A setting changing process of switching whether the type-free setting is abled or disabled in the present embodiment will be described with reference to FIGS. 3 and 4. FIG. 3 is a flowchart illustrating a process for changing a type-free setting to the manual feed tray 52. FIG. 4 is an image illustrating a setting changing screen 401 displayed on a display 103 in the setting changing process.

The setting changing process as illustrated in FIG. 3 is started in a case where a setting key, displayed on the display 103 in a standby state in which the image forming apparatus 101 stands by an input of an image forming job, is pressed. In response to the start of the setting changing process, the CPU 107 displays the setting changing screen 401 (see FIG. 4) on the display 103 in Step S11 to stand by an input of operational signals of an 'ON/OFF key' 402 and an 'OK' key 403.

In a case where one different from what has been set is selected among the ON/OFF key 402, i.e., Yes in Step S12, the CPU 107 changes the type-free setting in Step S13. Specifically, a value of a variable indicating whether the type-free setting of the manual feed tray 52 is abled or disabled and stored in the EEPROM 111 is rewritten. The CPU 107 receives such setting change until when the 'OK' key 403 is pressed. Then, when the 'OK' key 403 is pressed i.e., Yes in Step S14, the CPU 107 finishes the setting change. In a case where the CPU 107 receives the PDL job, the CPU 107 determines whether the type-free setting is abled or disabled by making reference to the variable stored in the EEPROM 111 as described later.

Default Setting of Manually Fed Sheet

Figure 5:
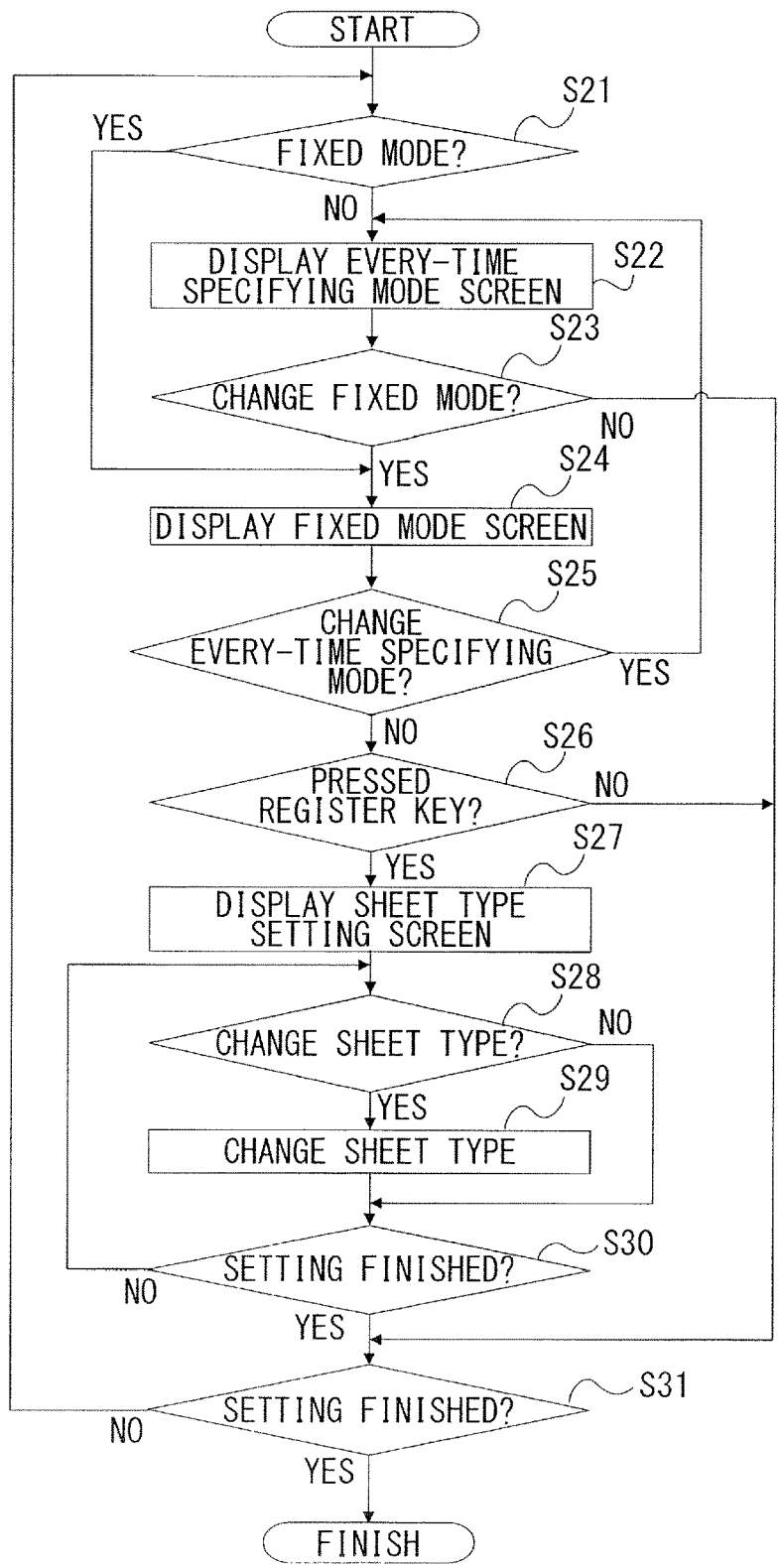
FIG. 5 is a flowchart illustrating a procedure of a setting changing process of a manual-feed-sheet default setting.
Figure 6A:
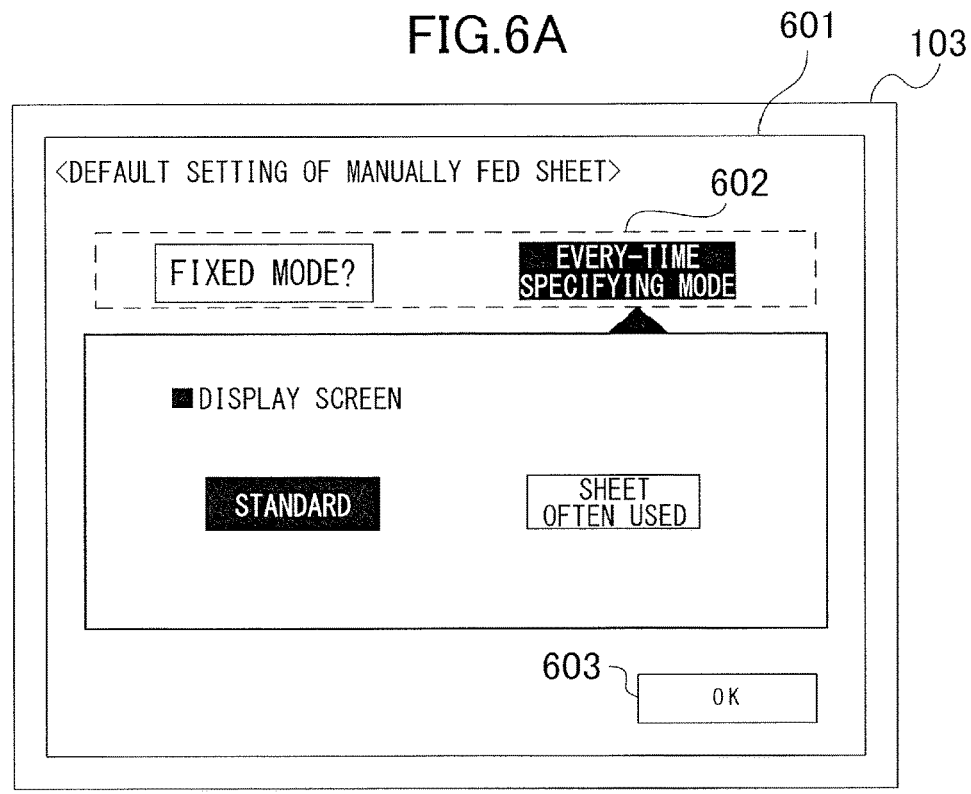
FIG. 6A is an image illustrating an every-time specifying mode screen of the manual-feed-sheet default setting.
Figure 6B:
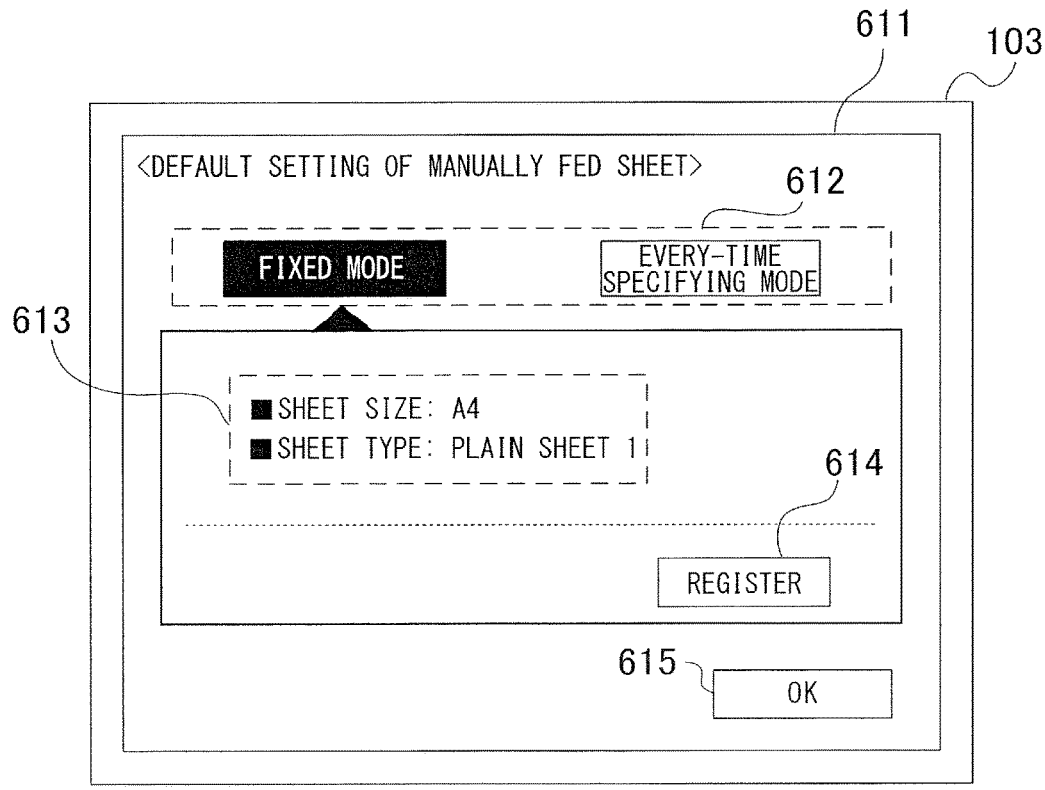
FIG. 6B is an image illustrating a fixed mode screen.
Figure 7:
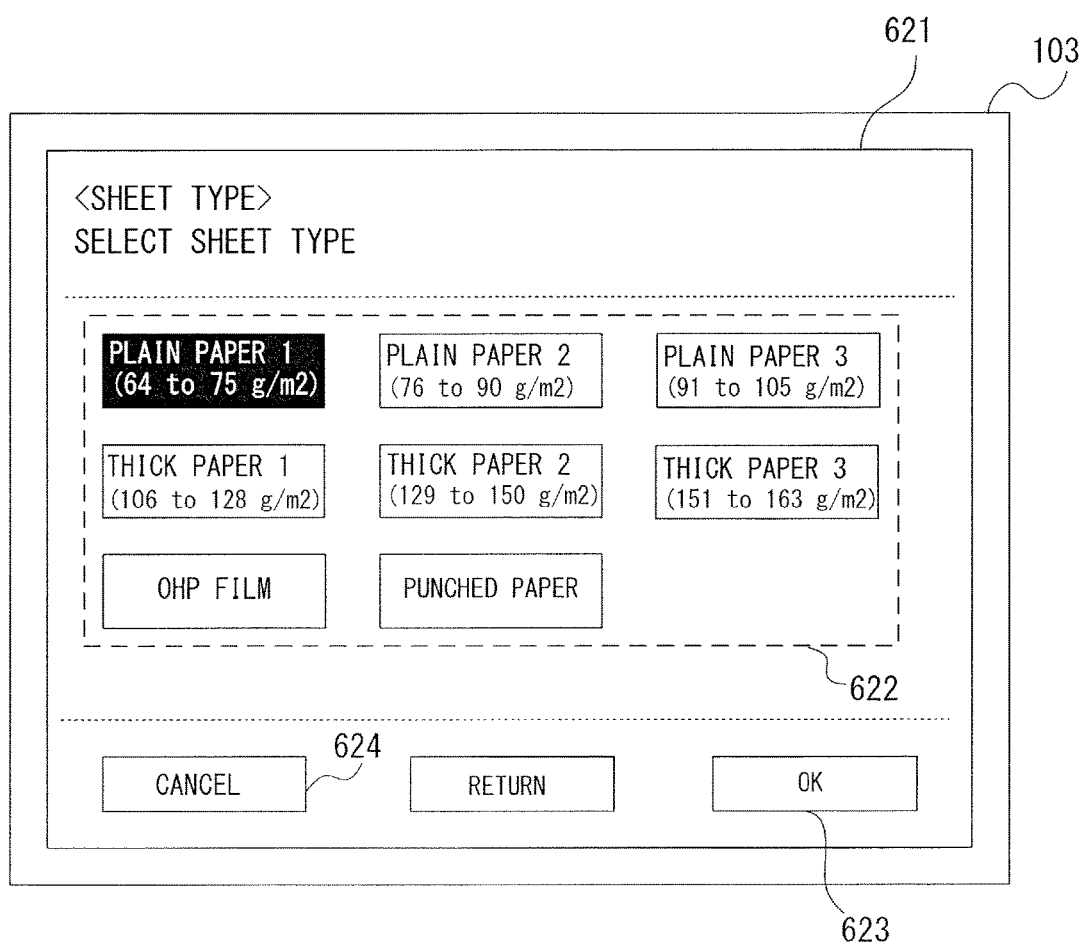
FIG. 7 is a sheet setting screen of the fixed mode.

Next, a default setting of a manually fed sheet will be described with reference to FIGS. 5 through 7. FIG. 5 is a flowchart illustrating a procedure of a setting changing process of a default setting of a manual feed sheet. FIG. 6A is an image illustrating a screen displayed on the display 103 in an every-time specifying mode. FIG. 6B is an image illustrating an image displayed on the display 103 in a fixed mode. FIG. 7 is an image displayed on the display 103 in selecting a sheet type.

The setting changing process as illustrated in FIG. 5 starts in a case where the setting key, displayed on the display 103 in the standby condition during which the image forming apparatus 101 stands by an input of an image forming job, is pressed. In response to the setting changing process, the CPU 107 obtains information concerning the default setting of the manually fed sheet from the EEPROM 111 and determines whether the fixed mode is set in Step S21. In a case where the fixed mode is set, i.e., Yes in Step S21, the CPU 107 advances to Step S24. In a case where the fixed mode is not set, i.e., No in Step S21, the CPU 107 causes the display 103 to display an every-time specifying mode screen 601 (see FIG. 6A) in Step S22.

As illustrated in FIG. 6A, an area 602 in which the 'fixed mode' and the 'every-time specifying mode' key are displayed and an 'OK' key 603 are displayed in the every-time specifying mode screen 601, and the 'every-time specifying mode' is selected in FIG. 6A. If the every-time specifying mode screen 601 is not operated by the user, the CPU 107 stands by in a condition of accepting the setting change as it is and advances to Step S31. Then, in a case where the 'every-time specifying mode' is selected in the default setting of the manually fed sheet, a sheet setting screen 801 (see FIG. 9A) is displayed on the display 103 when a sheet is placed on the manual feed tray 52. It is noted that the sheet setting screen 801 is not displayed on the display 103 even if a sheet is placed on the manual feed tray 52 in a case where the 'fixed mode' is selected.

When the user presses the 'fixed mode' key in the area 602, i.e., Yes in Step S23, a fixed mode screen 611 is displayed in the condition in which the 'fixed mode' key is pressed in Step S24 as illustrated in FIG. 6B. If the user presses the 'every-time specifying mode' key of the area 612 in the fixed mode screen 611, i.e., Yes in Step S25, the every-time specifying mode screen 601 is displayed in Step S22.

Information indicating the size and type of the sheet currently set is displayed in an area 613 of the fixed mode screen 611. For instance, information that the sheet size of A4 and the sheet type of 'plain sheet 1' are displayed as setting of initial values in the fixed mode. The information concerning the sheet size and the sheet type as the initial values in the fixed mode is stored in advance in the EEPROM 111. A 'register' key 614 in the fixed mode screen 611 is operated in a case where the sheet type currently set is to be changed. If the 'register' key 614 is pressed without accepting the change from the 'every-time specifying mode' in Step S25, i.e., Yes in Step S26, the CPU 107 causes the display 103 to display a sheet setting screen 621 (see FIG. 7) in Step S27. If the 'register' key 614 is not operated by the user in Step S26, the CPU 107 stands by while accepting the setting change as it is and advances to Step S31.

As illustrated in FIG. 7, an area 622, a 'Cancel' key 624, an 'OK' key 623 and others are displayed on the sheet setting screen 621. A list of sheet types on which the image forming apparatus 101 can form an image is displayed in the area 622. The user can select the sheet type by pressing an operational key associated per type of the sheet types. If either one of these operational keys is pressed, i.e., Yes in Step S28, the selected sheet type is clearly indicated by changing a color of the very operational key for example in Step S29. If the 'OK' key 623 is pressed, i.e., Yes in Step S30, in the condition in which either one operation key in the area 622 is selected, the CPU 107 displays the fixed mode screen 611 on the display 103 and advances to Step S31. At this time, values of variables indicating the sheet size and the sheet type corresponding to the manual feed tray 52 in the fixed mode and stored in the EEPROM 111 are rewritten by values corresponding to the sheet type selected in the area 622. It is noted that the values of the variables indicating the sheet type of the EEPROM 111 may be rewritten when either one operation key of the area 622 is pressed in the Step S28. Still further, in a case where a 'Cancel' key 624 of the sheet setting screen 621 is pressed in Step S28, the screen returns to the fixed mode screen 611 without changing the value of the variable indicating the sheet type in the fixed mode, i.e., No in Step S28, and in Step S30.

It is judged if either one of the 'OK' key 603 in the every-time specifying mode screen 601 and the 'OK' key 615 in the fixed mode screen 611 is pressed in Step S31. For instance, if the 'OK' key 603 is pressed, the information stored in the EEPROM 111 and concerning the default setting of the manually fed sheet is rewritten to a value indicating that the every-time specifying mode is selected. Thereby, the changing process of the default setting of the manually fed sheet is finished, i.e., Yes in Step S31. If the 'OK' key 615 is pressed, the information stored in the EEPROM 111 and concerning the default setting of the manually fed sheet is rewritten to a value indicating that the fixed mode is selected. The changing process of the default setting of the manually fed sheet is thus finished, i.e., Yes in Step S31. If none of the 'OK' key 603 and the 'OK' key 615 is pressed in Step S31, the process returns to Step S21.

Setting Sheet Attribute

Figure 8:
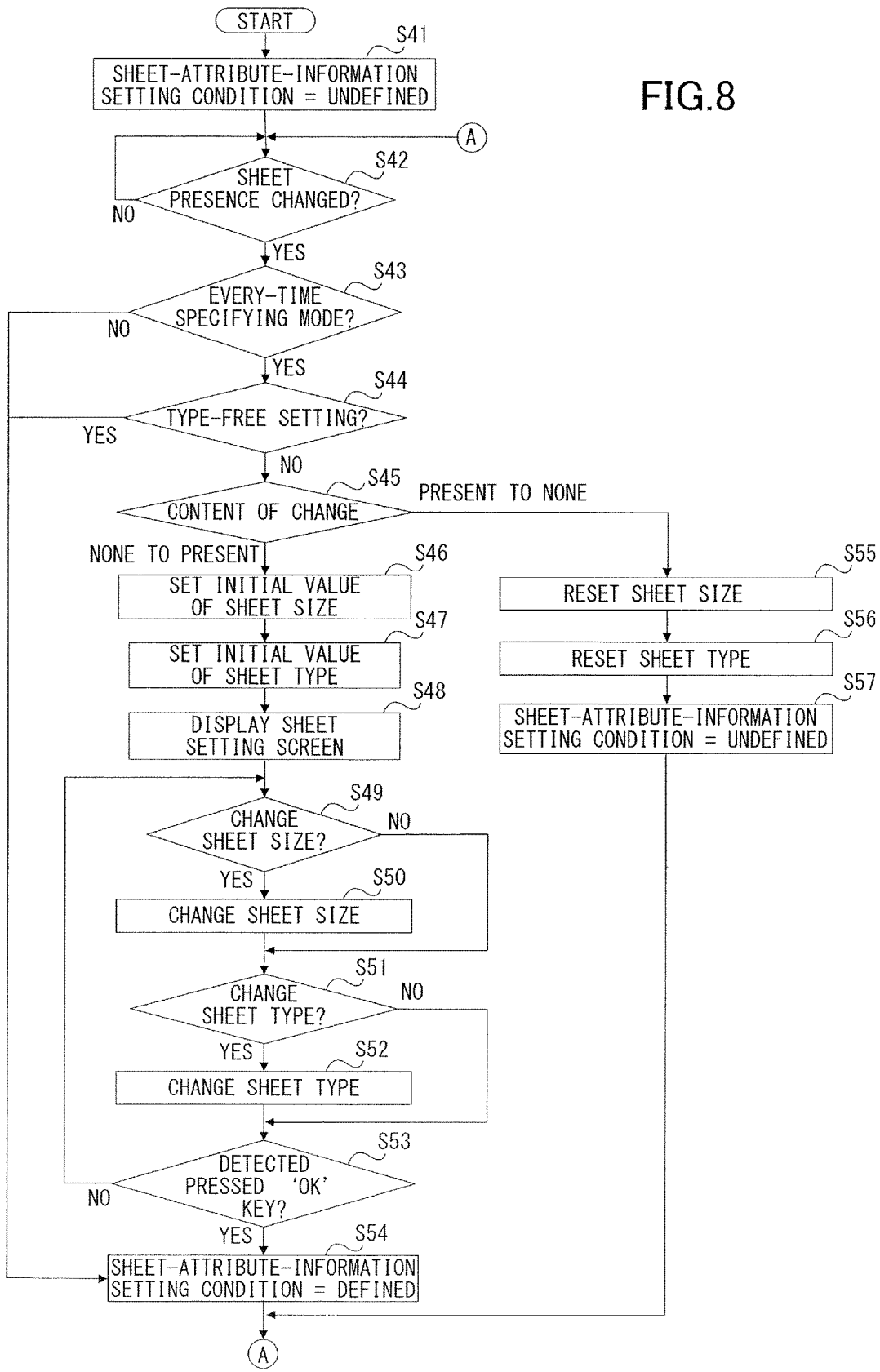
FIG. 8 is a flowchart illustrating a sheet attribute setting process.
Figure 9A:
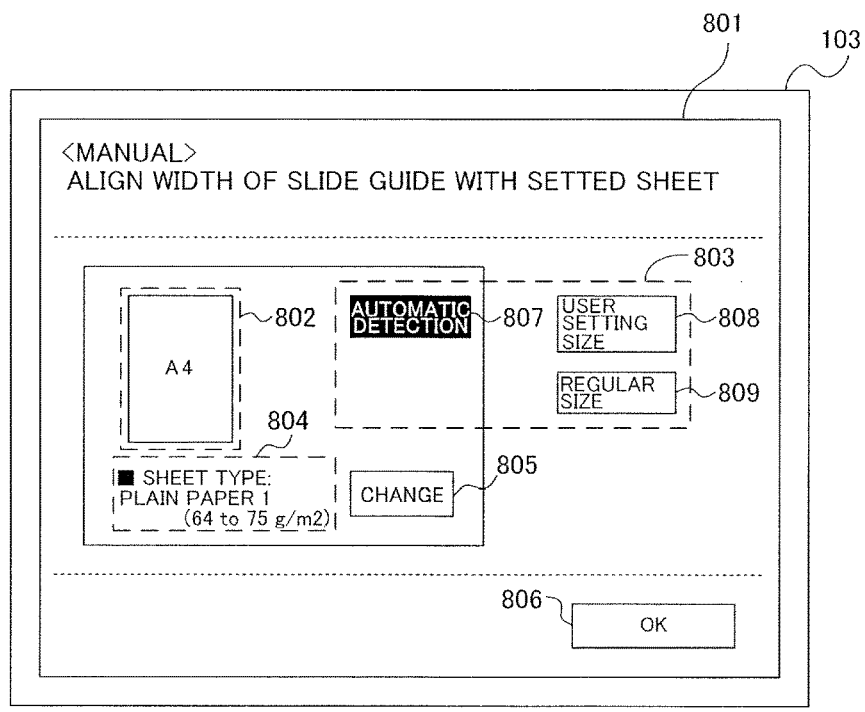
FIG. 9A is an image illustrating a sheet attribute information setting screen.
Figure 9B:
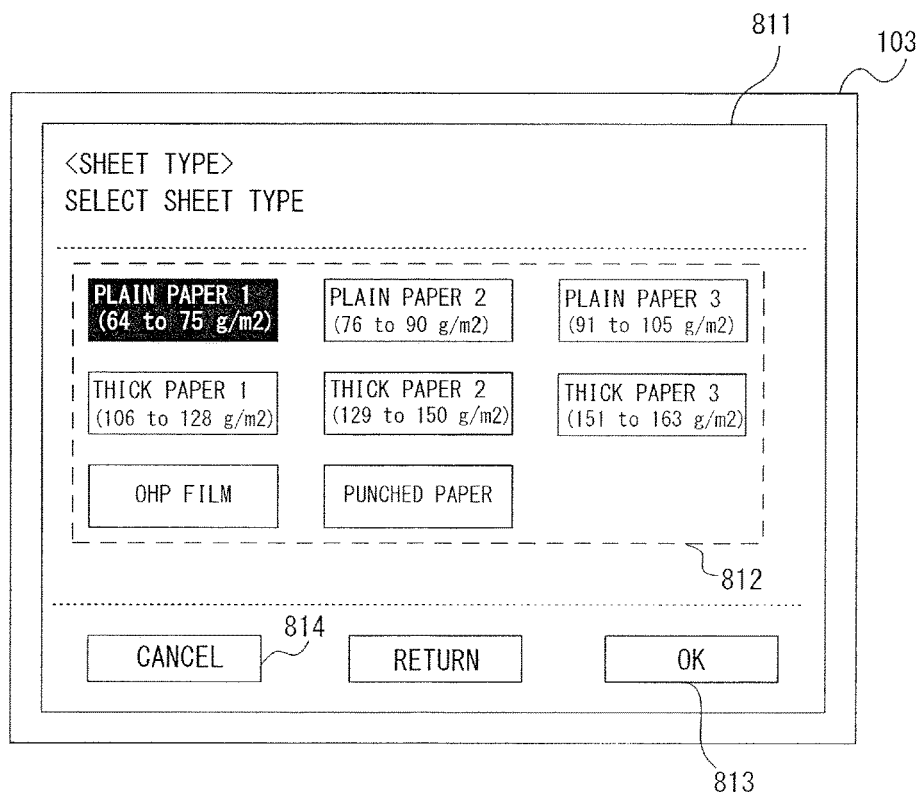
FIG. 9B is an image illustrating a sheet-type selecting screen.

Next, a sheet attribute setting process for setting sheet attribute information concerning a sheet placed on the manual feed tray 52 is set to the image forming apparatus 101 in the every-time specifying mode will be described with reference to FIGS. 8 through 9B. FIG. 8 is a flowchart illustrating the sheet attribute setting process, and FIGS. 9A and 9B are images indicating screens displayed on the display 103 in the sheet attribute setting process. While the following description will be made as a setting process for the manual feed tray 52, the same setting process is carried out also for each sheet feed cassette 51.

The sheet attribute setting process as illustrated in FIG. 8 is executed structurally in a condition in which a main power supply of the image forming apparatus 101 is ON for example. The CPU 107 sets a value of 'sheet-attribute-information setting condition', i.e., a setting variable, indicating whether sheet attribute information is defined as 'undefined' in Step S41. Then, in a case where a detection signal of the sheet detection sensor 56 (see FIG. 2B) disposed on the manual feed tray 52 is changed, i.e., Yes in Step S42, the CPU 107 executes a process corresponding to contents of the change in Step S45.

Next, the CPU 107 judges whether a mode is the every-time specifying mode, and if the CPU 107 determines to be the every-time specifying mode, i.e., Yes in Step S43, and advances the process. If the CPU 107 determines to be the fixed mode, i.e., No in Step S43, the CPU 107 advances the process to Step S54. The CPU 107 determines whether the type-free setting is abled or disabled in Step S44. If the CPU 107 determined the setting to be disabled, i.e., No in Step S44, the CPU 107 advances the process to Step S45. If the CPU 107 determines the setting to be abled, i.e., Yes in Step S44, the CPU 107 advances the process to Step S54. It is noted that the CPU 107 may determine whether the size-free setting or the driver setting priority is enabled or disabled instead of the type-free setting in Step S44.

Next, the CPU 107 judges the content of the detection signal of the sheet detection sensor 56 to detect whether a sheet is placed on or removed from the manual feed tray 52 in Step S45. Here, the detection signal transmitted by the sheet detection sensor 56 in a case where the sheet is placed on the manual feed tray 52 will be referred to as 'present' and the detection signal transmitted in a case where there is no sheet placed on the manual feed tray 52 will be referred to as 'none' for convenience sake.

In a case where a change of the detection signal of the sheet detection sensor 56 in Step S45 is from 'none' to 'present', i.e., none to present in Step S45, the CPU 107 substitutes an initial value in the setting variable representing the sheet size in Step S46. Here, the initial value is a value determined by using the size detection portions 54 and 57 disposed on the manual feed tray 52 or a preinstalled fixed value, and the user specifies in advance which value is adopted as the initial value.

The CPU 107 also substitutes an initial value in the setting variable representing the sheet type in Step S47. While a preinstalled sheet type is adopted as an initial value in the present embodiment, it is possible to configure such that the user can select an initial value in advance. In a case of a configuration in which a detection mechanism capable of obtaining information concerning the sheet type is disposed on the manual feed tray 52, a type determined based on a detection result may be also adopted as an initial value.

Next, the CPU 107 causes the display 103 to display a sheet setting screen 801 as illustrated in FIG. 9A in Step S48. Information indicating a currently set sheet size is displayed in an area 802 of the sheet setting screen 801, and information indicating a currently set sheet type is displayed in an area 804. Accordingly, an initial value of the size and an initial value of the type are displayed at a moment of time when the sheet setting screen 801 is displayed.

Various operational keys 807 through 809 for changing the sheet size are displayed in an area 803 of the sheet setting screen 801. Because an 'automatic detection' key 807 is selected in a case as illustrated in FIG. 9A, values specified based on detection results of the guide width sensor 54 and the length detection sensors 57 are set as the sheet size and orientation. In a case where the 'user setting size' key 808 is pressed, a screen which permits the user to input arbitrary values indicating a sheet length, i.e., a length in a sheet feed direction, and a sheet width, i.e., a widthwise length, is displayed. In a case where a 'regular size' key 809 is pressed, a screen which permits the user to select a sheet size and orientation out of regular size candidate group is displayed.

A 'Change' key 805 for changing the sheet type is displayed in the sheet setting screen 801. In a case where the 'Change' key 805 is pressed, the CPU 107 causes the display 103 to display a type setting screen 811 as illustrated in FIG. 9B. A list of selectively operable operation keys corresponding to sheet types handled by the image forming apparatus 101 is displayed in an area 812 of the type setting screen 811. Still further, a 'Cancel' key 814 for stopping the operation without changing the sheet type and an 'OK' key 813 for defining a selection result are also displayed in the type setting screen 811. The type setting screen 811 is closed and the sheet setting screen 801 is displayed in both cases where either the 'Cancel' key 814 or the 'OK' key 813 is operated.

In a case where an operation of changing the sheet size is made, i.e., Yes in Step S49 in the condition in which the sheet setting screen 801 is displayed, the CPU 107 changes the currently set sheet size to a value after the change in Step S50. At this time, the sheet size displayed in the area 802 is updated to that of the value after the change. Still further, in a case where an operation of changing the sheet type is made, i.e., Yes in Step S51, the CPU 107 changes the sheet type currently set to a value after the change in Step S52. At this time, the sheet type displayed in the area 804 is updated to that of the value after the change.

Then, when the 'OK' key 806 of the sheet setting screen 801 is pressed, i.e., Yes in Step S53, the CPU 107 sets the value of the 'sheet attribute information setting condition' stored in the EEPROM 111 as 'defined' in Step S54. At this time, the CPU 107 stores the sheet size and the sheet type displayed in the areas 802 and 804 as information concerning the sheet corresponding to the manual feed tray 52 in the process advanced from Step S51 or Step S52. That is, because the 'OK' key 806 of the sheet setting screen 801 displayed based on that the sheet is placed on the manual feed tray 52 is selectively operated, the sheet size and the sheet type corresponding to the manual feed tray 52 are set in the EEPROM 111.

Still further, the CPU 107 does not display the sheet setting screen 801 even if the sheet is placed on the manual feed tray 52 in the processes advanced from Steps S43 and S44 to Step S54 and simply set the value of the 'sheet attribute information setting condition' as 'defined'. That is, in the case where the type-free setting is enabled for the manual feed tray 52, the printing operation of the PDL job can be carried out without operating the display 103 and the operation portion 104. At this time, in the case where the fixed mode is set in Step S43, the content displayed in the area 613 of the fixed mode screen 611 is set in the EEPROM 111 as information concerning the sheet size and sheet type corresponding to the manual feed tray 52 based on that the sheet is placed on the manual feed tray 52. After processing Step S54, the CPU 107 returns to the standby condition in which the CPU 107 stands by a change of the detection signal of the sheet detection sensor 56 in Step S42. As described above, the every-time specifying mode is a third mode of displaying the sheet setting screen 801 as the attribute setting screen that permits to set the sheet size and the sheet type on the display 103 based on that the sheet is supported by the manual feed tray 52. The fixed mode is a fourth mode of not displaying the sheet setting screen 801 on the display 103 even if the sheet is supported on the manual feed tray 52.

In a case where the CPU 107 detects that the sheet has been removed from the manual feed tray 52 in the standby state, i.e., present to none in Step S45, the information concerning the sheet size and information concerning the sheet type are reset in Steps S55 and S56. Then, after setting the value of the 'sheet attribute information setting condition' to 'undefined' in Step S57, the CPU 107 returns to the standby condition in Step S42. It is noted that the reset of the information concerning the sheet size and the sheet type in Steps S55 and S56 can be made right away after detecting the detection signal of the sheet detection sensor 56, the present disclosure is not limited to such arrangement. For instance, the information concerning a size and a type of a previous sheet may be erased when the user places a new sheet on the manual feed tray 52.

PDL Job

A process for executing the PDL job by the image forming apparatus 101 will be described below. At first, contents of data received by the image forming apparatus 101 as the PDL job (referred to as a 'PDL data 900' hereinafter) will be described with reference to FIG. 10. The PDL data 900 is generated by the driver software installed in the host computer and is transmitted to the control unit 102 of the image forming apparatus 101 through a network such as LAN/WAN.

As illustrated in FIG. 10, roughly the PDL data 900 includes attribute data 911 representing attributes of the job and page data 920 which is an image data set to be printed. The attribute data 911 includes respective information of a data name 912, a number of copies 913, a sheet supply source 914, a sheet size 915, and a sheet type 916. The data name 912 is a title for discriminating the PDL data 900 and is assigned based on a file name of application data that has provided the page data 920 to the driver software. The number of copies 913 is information indicating a number of copies. The sheet supply source 914 is information indicating a supply source of the sheet to be used for printing. In a case where the user specifies a specific sheet support portion as the sheet supply source, a value indicating either one of the sheet feed cassettes and the manual feed tray 52 is stored as the sheet supply source 914. It is noted that the assignment of the sheet supply source 914 is arbitrary as for the PDL job, and a value indicating 'automatic selection' is stored as the sheet supply source 914 in a case where the user assigns no sheet supply source.

The sheet size 915 is information indicating a sheet size specified by the user. It is noted that it is essential to specify the sheet size in the PDL job in the present embodiment, and information of the sheet size 915 is always included in the PDL data 900 in the present embodiment. The sheet type 916 is information indicating a sheet type specified by the user. It is arbitrary to specify the sheet type 916 to the PDL job, and if the user specifies no sheet type, the information of the sheet type 916 is omitted. Still further, in a case where the function such as stapling and duplex printing mounted in the image forming apparatus 101 is used, information instructing to execute a corresponding function besides the respective information described above is included in the attribute data 911. The page data 920 includes image data described in a format of the PDL to which the image forming apparatus 101 corresponds per page.

Printing Operation by PDL Job

Figure 11:
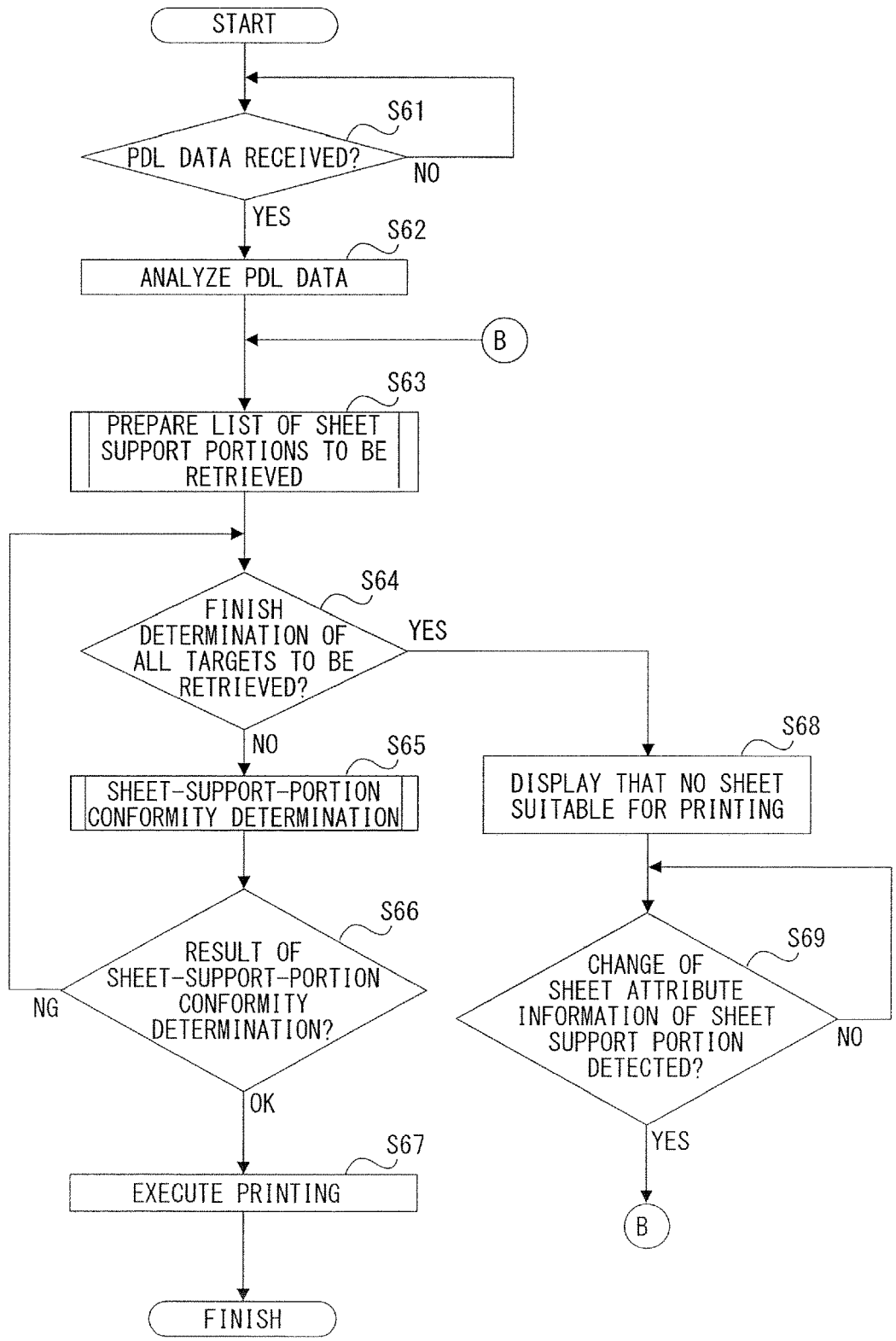
FIG. 11 is a flowchart illustrating a procedure of PDL job execution process.

Next, an outline of a procedure of the execution process for executing the PDL job will be described with reference to a flowchart of FIG. 11. This execution process is structurally executed in a state in which the main power source of the image forming apparatus 101 is ON and advances adequately when the CPU 107 receives the PDL data. The CPU 107 always confirms whether the PDL data 900 has been received through the network in Step S61. In a case where the CPU 107 receives the PDL data 900, i.e., Yes in Step S61, the CPU 107 analyzes the PDL data 900 and samples information including the sheet supply source 914, the sheet size 915 and the sheet type 916 of the attribute data 911 in Step S62.

Next, the CPU 107 prepares a list of sheet support portions to be retrieved among the sheet support portions, of the image forming apparatus 101, from which one which cannot be a sheet supply source is excluded based on the information of the sheet supply source 914 in Step S63. Then, the CPU 107 executes a sheet-support-portion conformity determination process in Step S65 to determine sequentially whether the sheet support portions included in the prepared list are usable as a sheet supply source in the image forming operation in Steps S64 through S66.

In a case where there is one determined to be OK (conformable) by the sheet-support-portion conformity determination process in the retrieved sheet support portions, i.e., OK in Step S66, the CPU 107 executes the printing process in Step S67. That is, the CPU 107 executes the printing process, i.e., the image forming process, of forming an image based on the page data 920 to the sheet fed from the sheet support portion by the image forming engine 50. The printing operation is finished when the printing of all pages and all number of copies specified by the PDL data 900 is completed.

Meanwhile, in a case where the result of the sheet-support-portion conformity determination process for all of the retrieved sheet support portions is NG, i.e., non-conformable and Yes in Step S64, the CPU 107 displays on the display 103 that there is no sheet suitable for printing in Step S68. Then, the CPU 107 stands by until when the sheet attribute information for any sheet support portion is changed, and in a case where the CPU 107 detects that the sheet attribute information has been changed, i.e., Yes in Step S69, the CPU 107 executes the preparation of a list of the sheet support portions to be retrieved and the sheet-support-portion conformity determination process again. That is, it is possible to restart the printing operation if the sheet supported by the feed cassette 51 or the manual feed tray 52 is replaced with a sheet of another size or another type.

Figure 12:
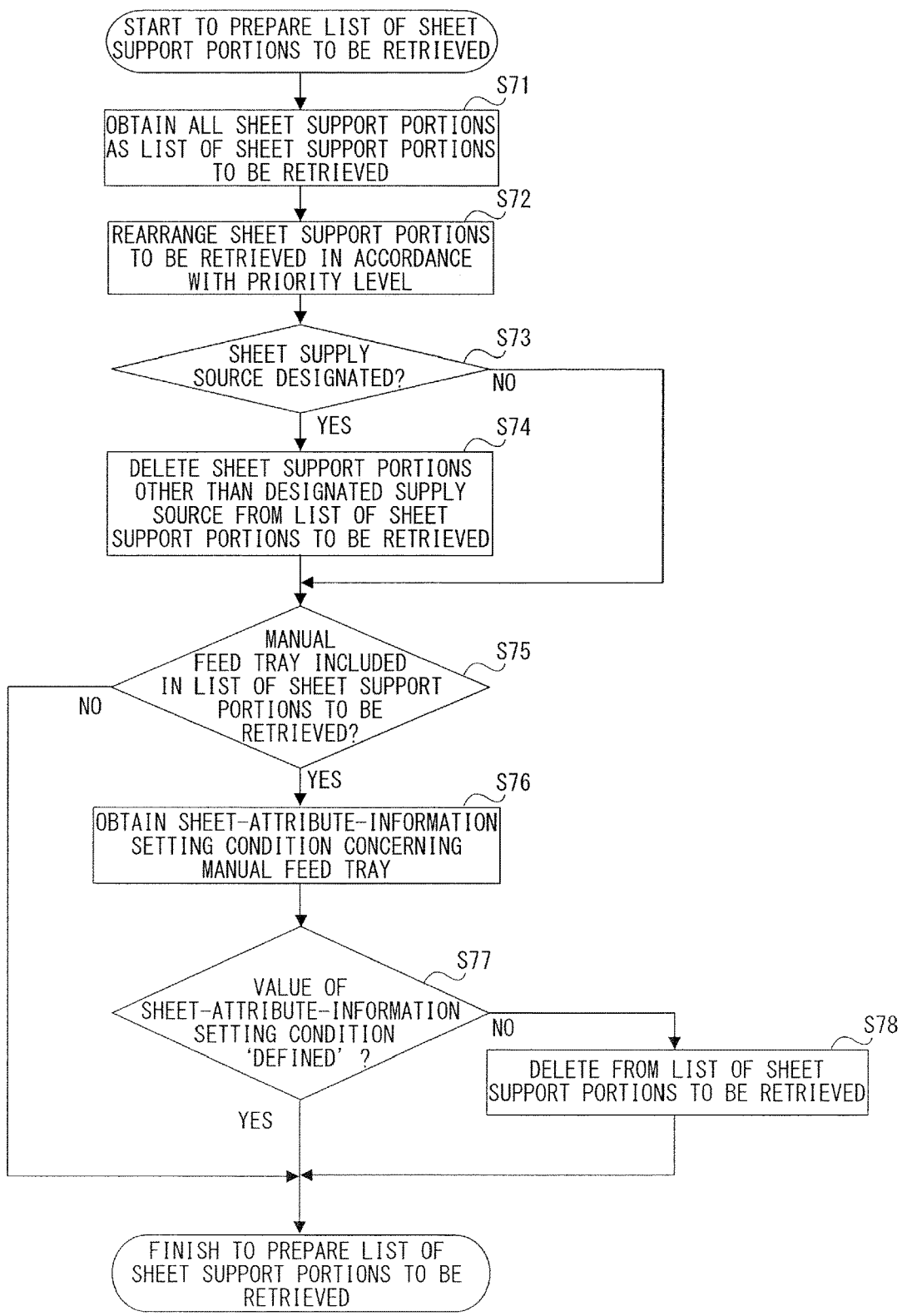
FIG. 12 is a flowchart illustrating a procedure of a process for preparing a list of sheet support portions to be retrieved as a sheet supply source.

Processing contents in preparing the list of the sheet support portions to be retrieved in Step S63 in FIG. in the PDL execution process described above will be described along a flowchart illustrated in FIG. 12. At first, the CPU 107 obtains a list of all of the sheet support portions provided in the image forming apparatus 101 to make the list of the sheet support portions to be retrieved in Step S71. Next, the CPU 107 sorts the obtained list of the sheet support portions in accordance to predetermined priority levels in Step S72. For instance, the priority level is set such that the sheet feed cassette is higher among the sheet feed cassette 51 and the manual feed tray 52, and such that the closer to the image forming engine 50, the higher the priority level is among the cassettes. Next, the CPU 107 determines whether the information of the sheet supply source exists in the analysis result of the PDL data 900 in Step S73. In a case where the sheet supply source is specified in the PDL job, i.e., Yes in Step S73, the CPU 107 deletes the sheet support portions other than the specified sheet supply source from the list of the sheet support portions to be retrieved in Step S74.

After processing Step S74 or in a case where there is no specification of the sheet supply source in the PDL job, the CPU 107 determines whether the manual feed tray 52 is included in the list of the sheet support portions to be retrieved in Step S75. In a case where the manual feed tray 52 is not included, i.e., No in Step S75, the list of the sheet support portions to be retrieved is defined by the content at that moment, and the CPU 107 finishes preparing the list. In a case where the manual feed tray 52 is included, i.e., Yes in Step S75, the CPU 107 collates the EEPROM 111 to obtain a value of a 'sheet-attribute-information setting condition' concerning the manual feed tray 52 in Step S76. In a case where the 'sheet-attribute-information setting condition' is 'definite', i.e., Yes in Step S77, the CPU 107 defines the list of the sheet support portions to be retrieved by the content at that moment. Meanwhile, in a case where the 'sheet-attribute-information setting condition' is 'indefinite', i.e., No in Step S77, the CPU 107 deletes the manual feed tray 52 from the list of the sheet support portions to be retrieved in Step S78 and finishes preparing the list.

Figure 13:
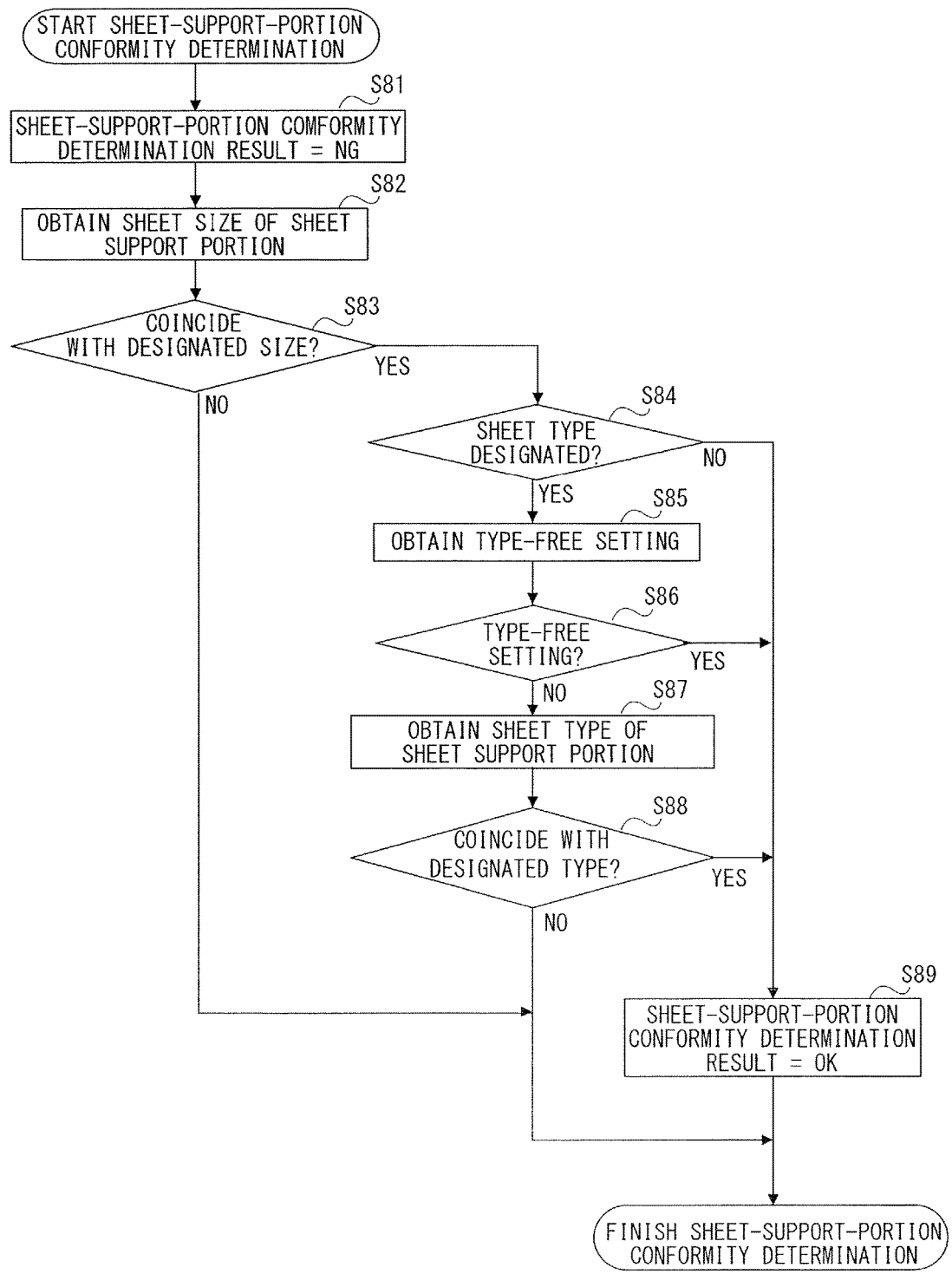
FIG. 13 is a flowchart illustrating a procedure of a conformity judging process for judging whether the sheet support portion to be retrieved is conformable as the sheet supply source.

In succession, processing contents in executing the sheet-support-portion conformity determination process in Step S65 in FIG. 11 in the PDL execution process described above will be described along a flowchart in FIG. 13. At first, the CPU 107 sets a variable representing a determination result of the sheet-support-portion conformity determination process as 'NG' to initialize the process in Step S81 and obtains information concerning the sheet size corresponding to the sheet support portion specified as an object of retrieval in Step S82. Next, the CPU 107 judges whether the sheet size specified by the PDL job coincides with the sheet size corresponding to the sheet support portion specified as an object of retrieval in Step S83. The CPU 107 advances the process to Step S84 when these are coincident with each other or finishes the sheet-support-portion conformity determination process when they do not coincide.

In Step S84, the CPU 107 judges whether the sheet type is specified in the PDL job. In a case where the sheet type is specified in the PDL job, i.e., Yes in Step S84, the CPU 107 obtains the setting of the type-free concerning the sheet support portion specified as the object of the retrieval in Step S85. Next, the CPU 107 judges whether the type-free setting is enabled or disabled. If the type-free setting is disabled, i.e., No in Step S86, the CPU 107 obtains the information concerning the sheet type corresponding to the sheet support portion from the EEPROM 111 in Step S87. Still further, the CPU 107 judges whether the sheet type specified by the PDL job coincides with the sheet type corresponding to the sheet support portion specified as the target of retrieval in Step S88. If they do not coincide, the CPU 107 finishes the sheet-support-portion conformity determination process. That is, as for the sheet support portion for which the type-free setting is not enabled, NG (not conformable) is brought about in a case where the size and the type of the sheet specified by the PDL job do not coincide with the size and type of the sheet stored in the EEPROM 111. In this case, the CPU 107 stores that the sheet-support-portion conformity result was NG (not conformable) in the EEPROM 111 and finishes the process.

Meanwhile, in a case where the sheet type is not specified in the PDL job in Step S84 and in cases where the type-free setting is abled in Step S86 and the sheet type coincide in Step S88, the conformity determination result becomes OK (conformable) in Step S89. That is the CPU 107 stores that the sheet-support-portion conformity result is OK (conformable) in the EEPROM 111 and finishes the process.

Setting of Copy Job

Figure 14:
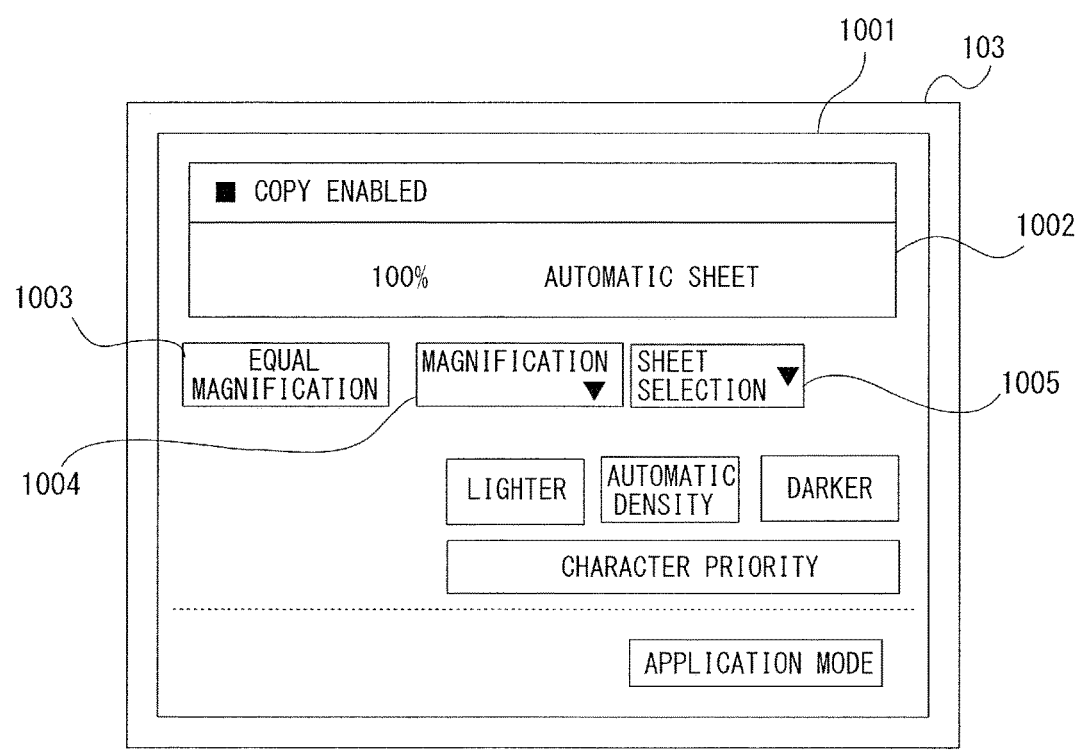
FIG. 14 is an image illustrating a copy setting screen.

Next, setting of a copy job of forming an image based on image information read by the scanner unit 106 will be described. If the user selects a copying function through the operation portion 104, a copying setting screen 1001 is displayed on the display 103 as illustrated in FIG. 14. In the copying setting screen 1001, an area 1002 in which a copying magnification and the sheet supply source to be used are indicated, an 'equal magnification' key 1003, a 'magnification' key 1004, a 'sheet selection' key 1005, and the like are displayed. The copying magnification is a rate of a size of printing data with respect to data of read document.

If the user presses the 'equal magnification' key 1003, the copying magnification is specified as the equal magnification, i.e., to 100%. If the user presses the 'magnification' key 1004, a changing screen by which the copying magnification can be changed is displayed. It is noted that the copying setting screen 1001 permits to make various settings such as an adjustment of density of printing with respect to a document image, selection of color or monochrome, a number of copies, a post-processing such as stapling, duplex printing, and others.

Figure 15:
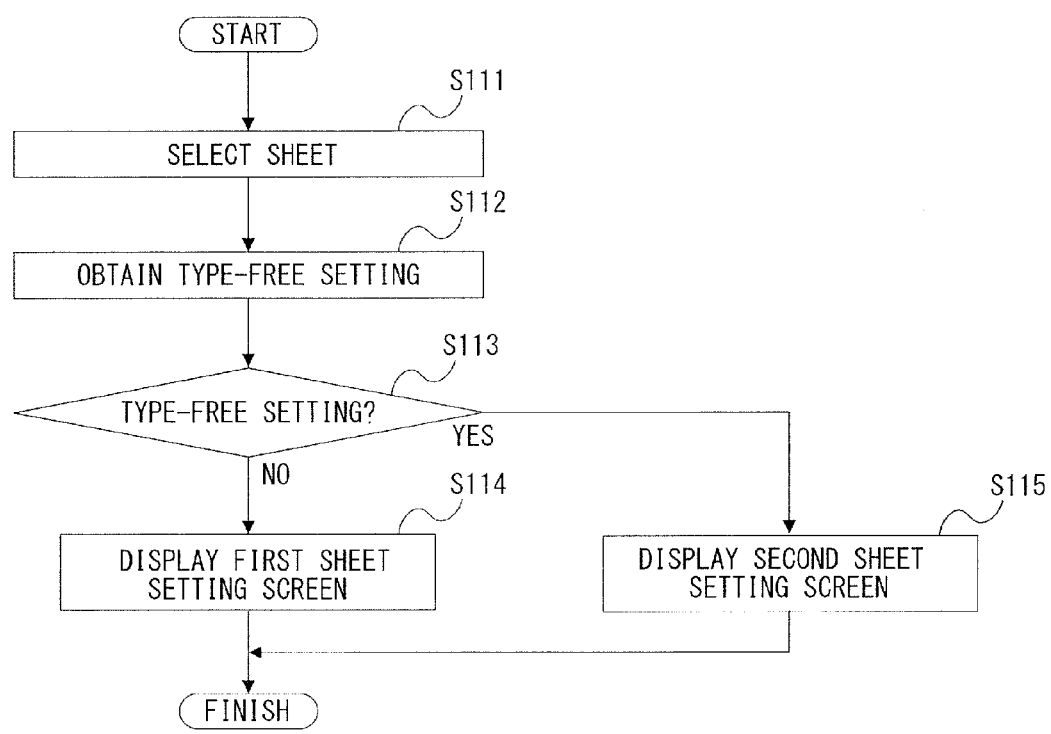
FIG. 15 is a flowchart illustrating a procedure of sheet supply source setting process of a copy job.
Figure 16A:
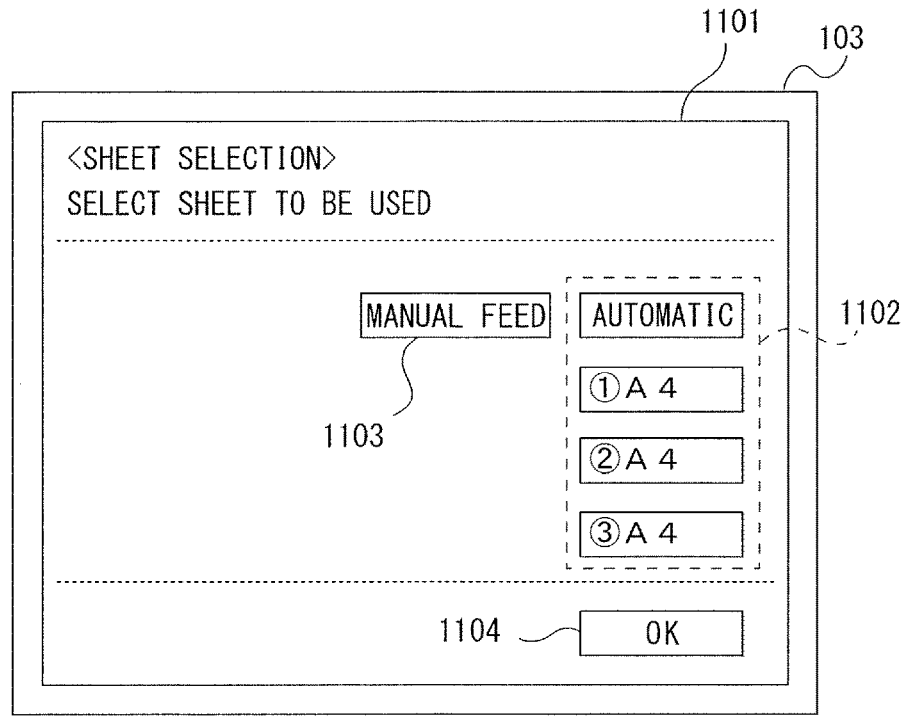
FIG. 16A is an image illustrating a first sheet setting screen.

FIG. 15 is a flowchart illustrating a procedure of a sheet supply source setting process of the copy job. The CPU 107 stands by in a condition in which the copying setting screen 1001 is displayed and when the 'sheet selection' key 1005 is pressed in Step S111, the CPU 107 obtains the information concerning the type-free setting stored in the EEPROM 111 in Step S112. In a case where the type-free setting is disabled, i.e., No in Step S113, the CPU 107 causes the display 103 to display a first sheet setting screen 1101 as illustrated in FIG. 16A. Meanwhile, in a case where the type-free setting is abled, i.e., Yes in Step S113, the CPU 107 causes the display 103 to display a second sheet setting screen 1111 as illustrated in FIG. 16B in Step S115.

As illustrated in FIG. 16A, the first sheet setting screen 1101, i.e. selection screen or first image, includes a 'manual feed' key 1103, an area 1102 including an 'automatic' key and a plurality of keys corresponding to each sheet feed cassette, and an 'OK' key 1104. In a case where the user selects the 'automatic' key, the copy job becomes a job in which the sheet supply source is not specified and a sheet support portion capable of copying is retrieved in accordance to a priority level defined in advance when the copy job is inputted. If the user wants to select the sheet supply source individually, the user selects the 'manual feed' key 1103 or the key corresponding to each sheet feed cassette. If the 'OK' key 1104 is pressed in a condition in which the 'manual feed' key 1103 or either one key in the area 1102 is selected, the CPU 107 stores that the sheet support portion corresponding to the key is selected as the sheet supply source in the EEPROM 111. It is noted that in the first sheet setting screen 1101, the 'manual feed' key 1103 and any key in the area 1102 are made to be selectable.

Figure 16B:
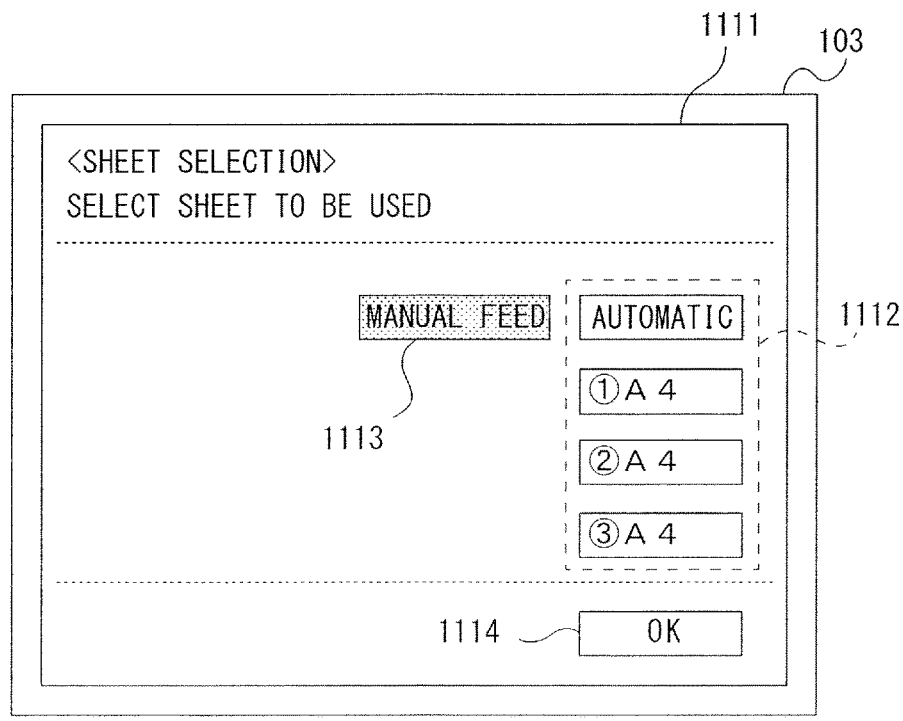
FIG. 16B is an image illustrating a second sheet setting screen.

As illustrated in FIG. 16B, the second sheet setting screen 1111, i.e. selection screen or second image, includes a 'manual feed' key 1113, an area 1112 including an 'automatic' key and a plurality of keys corresponding to each sheet feed cassette, and an 'OK' key 1114. In a case where the user presses the 'OK' key 1114 in a condition in which the 'manual feed' key 1113 or either key within the area 1112 is selected, the CPU 107 stores the sheet support portion corresponding to the key in the EEPROM 111 as a sheet supply source. It is noted that while the user can select the key within the area 1112 in the second sheet setting screen 1111, the 'manual feed' key 1113 is grayed out and cannot be selected as a sheet supply source.

It is because the sheet setting screen 801 is not displayed on the display 103 even if a sheet is placed on the manual feed tray 52 in the case where the type-free setting is enabled for the manual feed tray 52 as described in Step S44 in FIG. 8 described above. That is, because the copy job is a job which does not specify the sheet type, it is unable to carry out an adequate copying operation corresponding to the sheet type if the sheet support portion for which the type-free setting is enabled is selected as the sheet supply source.

In the present embodiment, the sheet setting screen 801 which enables to set the sheet type is not displayed on the display 103 from the beginning when the sheet is placed on the manual feed tray 52 in the every-time specifying mode. Due to that, it is unable to associate information concerning the adequate sheet type with the manual feed tray 52. Then, according to the present embodiment, the second sheet setting screen 1111 which disables to select the manual feed tray 52 as the sheet supply source even if the 'sheet selection' key 1005 is pressed is displayed on the display 103 in the case where the type-free setting is enabled for the manual feed tray 52.

It is noted that while the type-free setting is enabled on for the manual feed tray 52 in the present embodiment, it is possible to configure such that the type-free setting is enabled also for the feed cassette 51 which is another sheet support portion. Therefore, in a case where the type-free setting is enabled for the uppermost sheet feed cassette 51 for example, the upper most sheet feed cassette 51 is grayed out and becomes unable to select in the second sheet setting screen 1111.

Copying Operation by Copy Job

Figure 17:
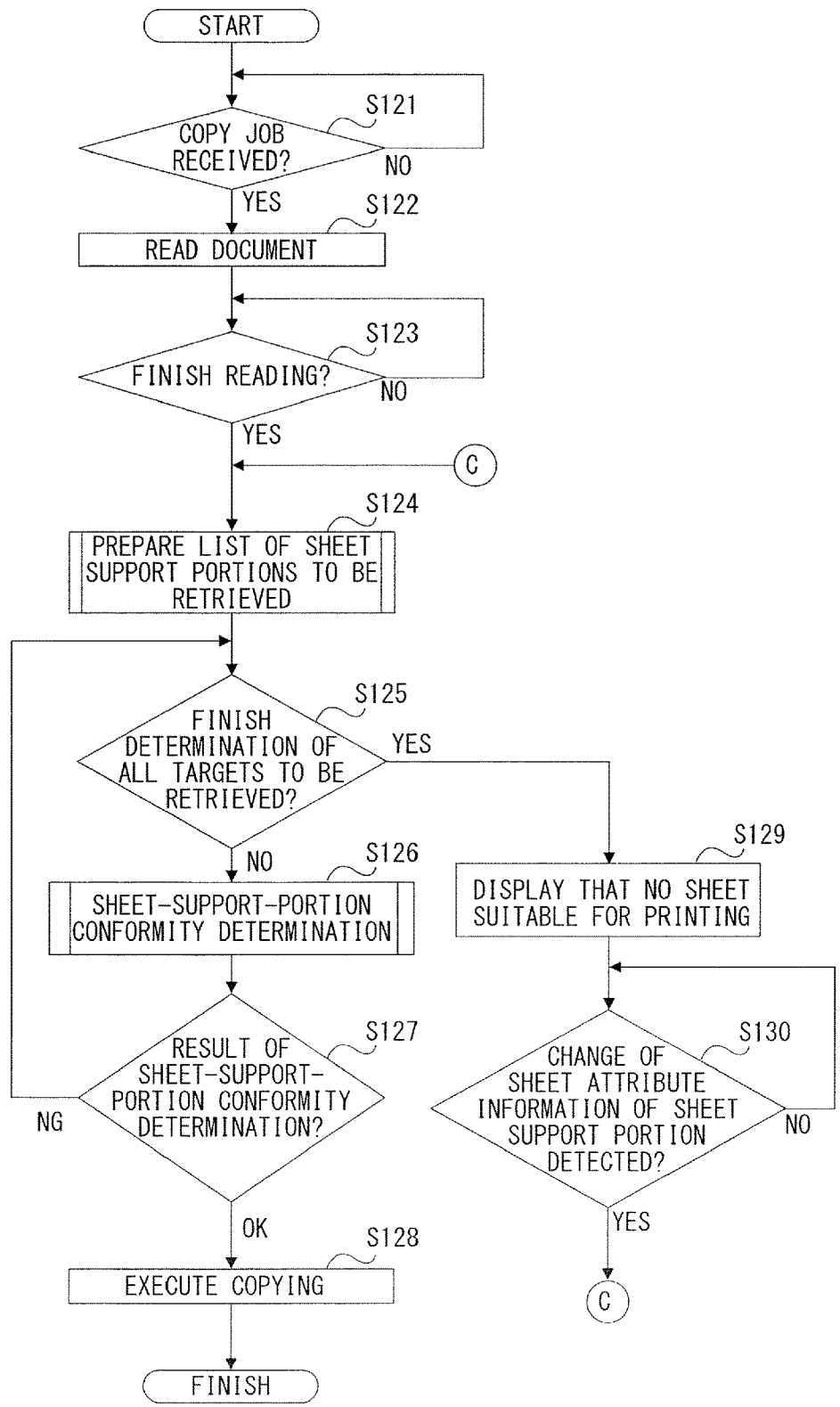
FIG. 17 is a flowchart illustrating a procedure of a copy job execution process.

Next, a procedure of an execution process for executing the copy job will be described with reference to a flowchart as illustrated in FIG. 17. It is noted that this execution process is structurally executed in the condition in which the main power source of the image forming apparatus 101 is ON and is appropriately advanced by receiving the copy job. The CPU 107 always confirms whether the copy job is received in Step S121. It is noted that the copy job is transmitted by pressing a start button included in the operation portion 104 for example. In a case where the copy job is received, i.e., Yes in Step S121, the CPU 107 executes the document reading operation of the scanner unit 106 in Step S122. Specifically, the CPU 107 conveys the document placed at a predetermined position to read the image on the document and causes to execute an operation of generating image data corresponding to the read image.

When the document reading operation ends, i.e., Yes in Step S123, the CPU 107 prepares a list of sheet support portions to be retrieved from which sheet support portions which cannot be the sheet supply source are excluded out of a plurality of sheet support portions based information of the sheet supply source of the copy job in Step S124. Then, the CPU 107 executes a sheet-support-portion conformity determination in Step S126 for judging sequentially whether the sheet support portions included in the prepared list are usable as the sheet supply source in the image forming operation in Steps S125 through S127.

In a case where there is one determined to be OK (conformable) by the sheet-support-portion conformity determination in the sheet support portions to be retrieve, i.e., ON in Step S127, the CPU 107 executes the copying operation in Step S128. That is, the CPU 107 executes the copy (image formation) based on the image information read by the scanner unit 106 to the sheet fed from the sheet support portion by the image forming engine 50. The copying operation ends when copying of all pages and all number of copies read by the scanner unit 106 is completed.

Meanwhile, in a case where the result of the sheet-support-portion conformity determination for all of the sheet support portions to be retrieve is NG (non-conformable), i.e., Yes in Step S125, the CPU 107 displays on the display 103 that there is no sheet suitable for copying in Step S129. Then, the CPU 107 stands by until when the sheet attribute information for either sheet support portion is changed, and in a case where the CPU 107 detects the change of the sheet attribute information, i.e., Yes in Step S130, the CPU 107 again executes the preparation of the list of sheet support portions to be retrieved and the sheet-support-portion conformity determination. That is, it is possible to restart the copying operation if the sheet supported by the feed cassette 51 or the manual feed tray 52 is replaced with a sheet of another size.

Figure 18:
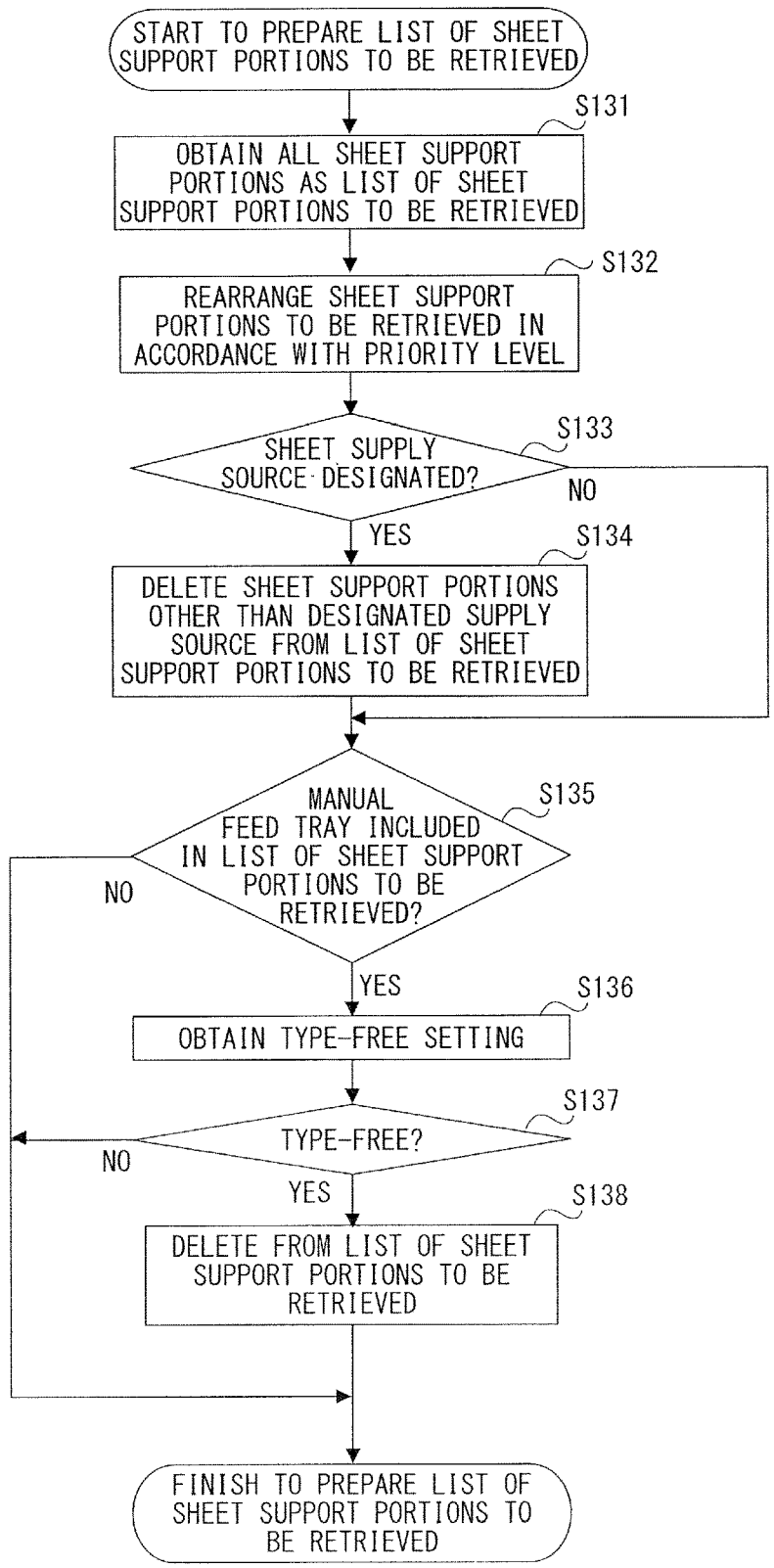
FIG. 18 is a flowchart illustrating a procedure of a process for preparing a list of sheet support portions to be retrieved as a sheet supply source.

Contents of a process in preparing the list of the sheet support portions to be retrieved, i.e., Step S124 in FIG. 17, in the copy job execution process will be described along a flowchart in FIG. 18. At first, the CPU 107 obtains a list of all sheet support portions provided in the image forming apparatus 101 to adopt as a list of sheet support portions to be retrieved in Step S131. Next, the CPU 107 rearranges the obtained list of the sheet support portions in accordance to a priority level set in advance in Step S132. For instance, the feed cassette 51 is set to be high in the priority level among the feed cassette 51 and the manual feed tray 52, and a cassette closer to the image forming engine 50 is set be high in the priority level among the cassettes. Next, the CPU 107 judges whether the copy job includes information on the sheet supply source in Step S133.

Here, the copy job having no information of sheet supply source is the copy job in the case where the 'automatic' key is selected in the area 1102 or the area 1112. The copy job including information of sheet supply source is the copy job in the case where the corresponding to each sheet support portion, other than the 'automatic' key, is selected. In the case where the sheet supply source is specified in the copy job, Yes in Step S133, the sheet support portions other than the specified sheet supply source are deleted from the table of sheet support portions to be retrieved in Step S134.

After the process of Step S134 or in a case where no sheet supply source is specified in the copy job, i.e., No in Step S133, the CPU 107 judges whether the manual feed tray 52 is included in the list of sheet support portions to be retrieved in Step S135. In a case where the manual feed tray 52 is not included in the list, i.e., No in Step S135, the CPU 107 defines the list of sheet support portions to be retrieved by the contents at that moment and finishes the preparation of the list. In a case where the manual feed tray 52 is included, i.e., Yes in Step S135, the CPU 107 obtains information concerning the type-free setting from the EEPROM 111 in Step S136.

In a case where the type-free setting is disabled for the manual feed tray 52, i.e., No in Step S137, the CPU 107 defines the list of sheet support portions to be retrieved by the contents at that moment. Meanwhile, in a case where the type-free setting for the manual feed tray 52 is enabled, i.e., Yes in Step S137, the CPU 107 deletes the manual feed tray 52 from the list of sheet support portions to be retrieved in Step S138 and finishes the preparation of the list. That is, it is possible to execute the image forming operation on the sheet supported in the other sheet support portion, i.e., the feed cassette 51, except of the sheet support portion, i.e., the manual feed tray 52, for which the type-free setting is enabled. However, the sheet support portion, i.e., the manual feed tray 52, for which the type-free setting is enabled will not be specified as the sheet supply source of the copy job.

Figure 19:
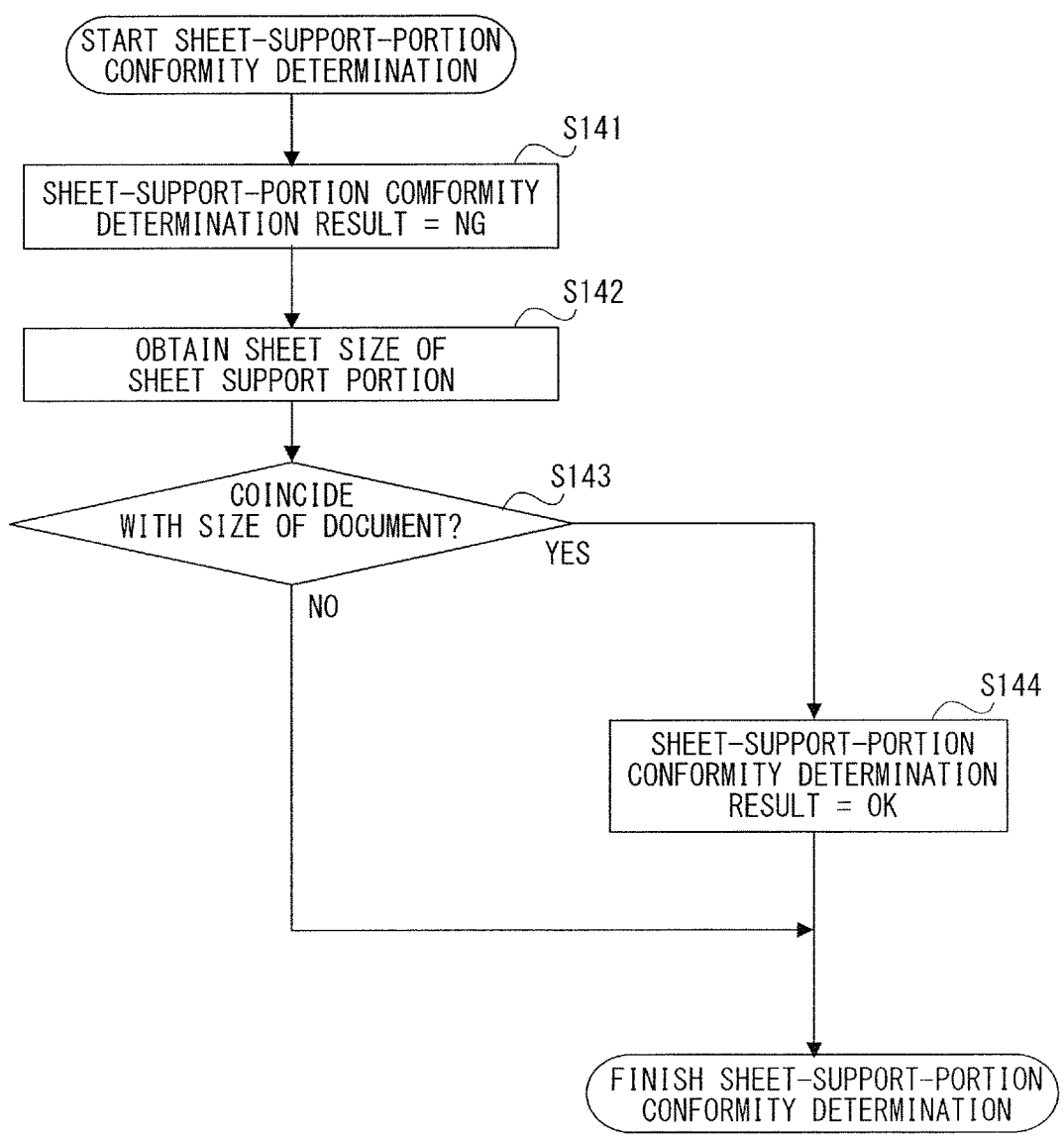
FIG. 19 is a flowchart illustrating a procedure of a conformity judging process for judging whether the sheet support portion to be retrieved is conformable as the sheet supply source.

Next, contents of a process carried out in the sheet-support-portion conformity determination, i.e., Step S126 in FIG. 17, in the copy job execution process described above will be described along a flowchart in FIG. 19. At first, the CPU 107 sets the variable indicating a determination result of the sheet-support-portion conformity determination as 'NG' to initialize in Step S141 and obtains information concerning the sheet size corresponding to the sheet support portion specified as the object to be retrieved in Step S142. Next, the CPU 107 determines whether a document size detected by a detection sensor not illustrated and provided in the scanner unit 106 coincides with the sheet size corresponding to the sheet support portion specified as the object to be retrieved in Step S143. It is noted that while the description will be made here subject to a case of printing on a sheet of the same size with the document size, i.e., an equal magnification copy, a consideration will be made in a case where setting of an enlarged copy or a contracted copy of an image is made. For instance, if a document size is A4 size and if a copying magnification of 141% is specified, the CPU 107 judges whether the sheet size obtained in Step S142 is an A3 size sheet.

In a case where the document size does not coincide with the obtained sheet size, i.e., No in Step S143, the CPU 107 stores that the sheet-support-portion conformity result was NG, i.e., non-conformable in the EEPROM 111 and finishes the process. Meanwhile, in a case where these sizes are coincident, i.e., Yes in Step S143, the CPU 107 stores that the sheet-support-portion conformity result is OK, i.e., conformable, in the EEPROM 111 and finishes the process.

As described above, according to the present embodiment, the sheet setting screen 801 is not displayed on the display 103 even if a sheet is placed on the manual feed tray 52 in the case where the type-free setting is enabled for the manual feed tray 52. Therefore, the printing operation of the PDL job can be carried out without operating the display 103 and the operation portion 104 in printing in the PDL job, thus reducing the operational burden of the user.

Still further, in the case where the type-free setting is enabled for the manual feed tray 52, the 'manual feed' key 1113 is grayed out in the second sheet setting screen 1111 and is disabled to be selected as the sheet supply source. The manual feed tray 52 for which the type-free setting is enabled will not be also selected as the sheet supply source for the copy job having no information of the sheet supply source. Therefore, the copying operation will not be started in a condition in which the sheet type is not specified on the both sides of the image forming apparatus and the job. This arrangement makes it possible to prevent an inadequate copying operation in which the sheet type is unknown from being carried out.

Second Embodiment

While a second embodiment of the present disclosure will be described next, the second embodiment is different from the first embodiment in that the preparation process of the list of sheet support portions to be retrieved in the copy job execution process, i.e., Step S124 in FIG. 17. Accordingly, the same components with those of the first embodiment will not be illustrated or be described by denoting the same reference numerals.

Figure 20:
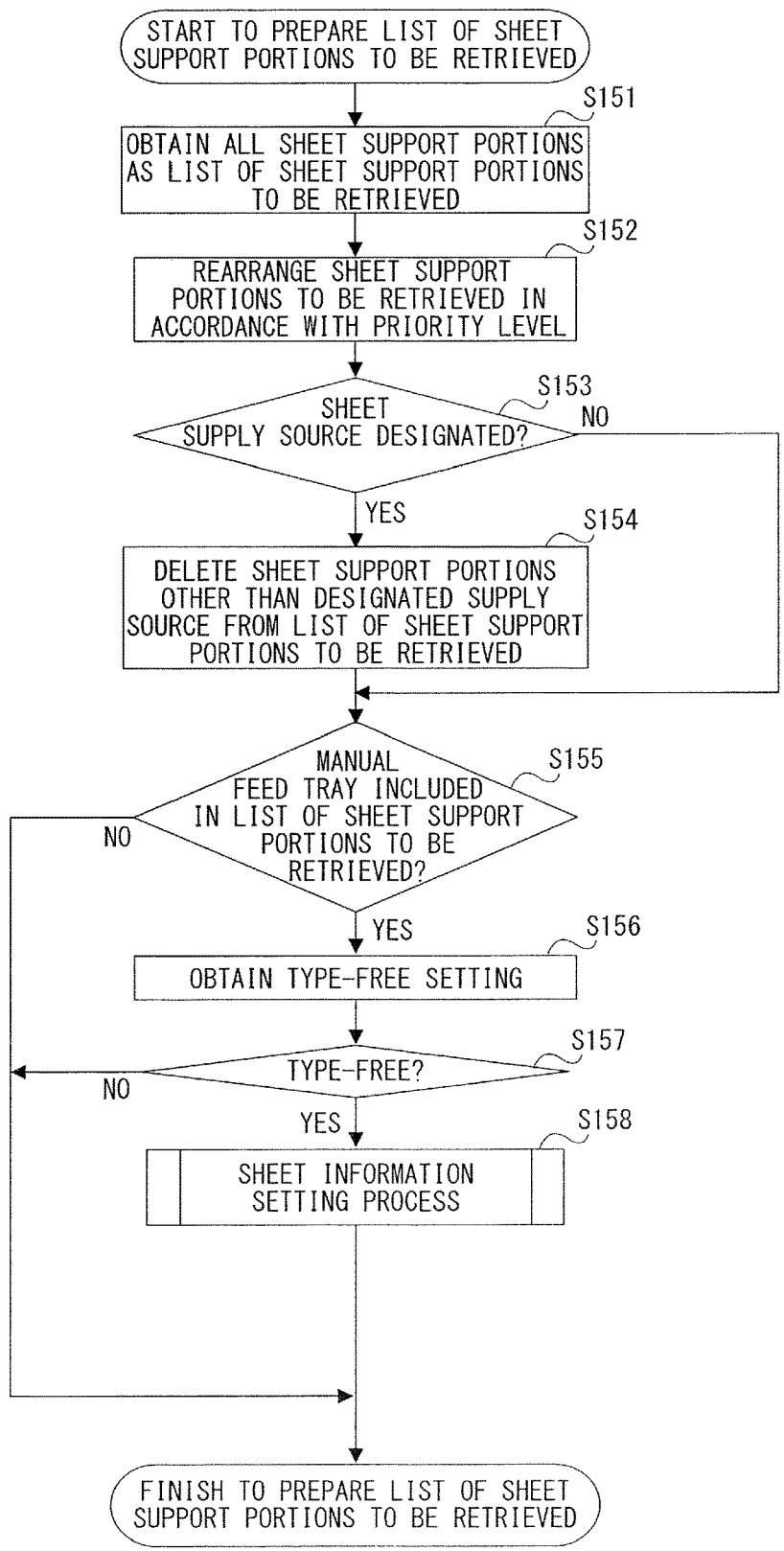
FIG. 20 is a flowchart illustrating a procedure of a process for preparing a list of sheet support portions to be retrieved as a sheet supply source of a second embodiment.

A procedure of a preparation process of the list of sheet support portion to be retrieved of the second embodiment will be described with reference to a flowchart in FIG. 20. It is noted that because Steps S151 through S157 are same with Steps S131 through S137 (see FIG. 18) of the first embodiment, their description will be omitted here. In the case where the type-free setting is enabled for the manual feed tray 52, i.e., Yes in Step S157, the CPU 107 performs a sheet information setting process in Step S158.

Figure 21:
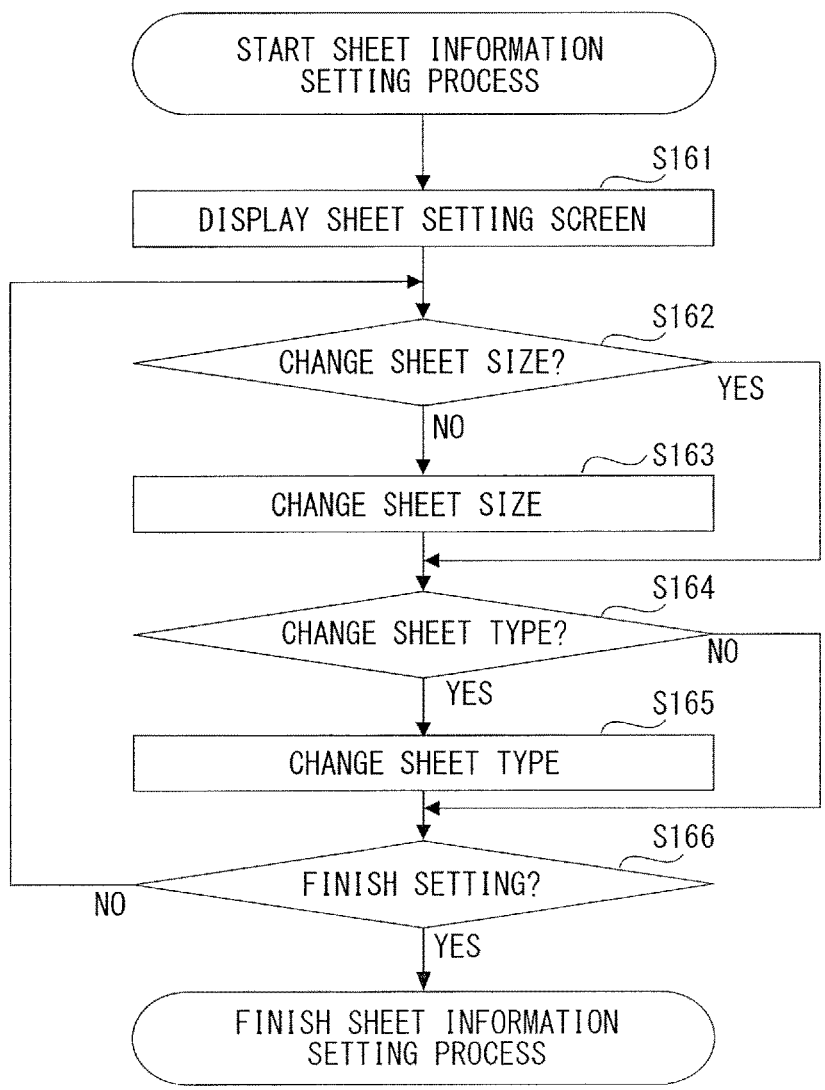
FIG. 21 is a flowchart illustrating a procedure of a sheet information setting process.

When the sheet information setting process is started, the CPU 107 displays the sheet setting screen 801 (see FIG. 9A) on the display 103 in Step S161 as illustrated in FIG. 21. In a case where an operation of changing the sheet size is made, i.e., Yes in Step S162, in the condition in which the sheet setting screen 801 is displayed, the CPU 107 changes a value of the sheet size currently set to a value after the change in Step S163. At this time, the sheet size indicated in the area 802 is updated to the value after the change. Still further, in a case where an operation of changing the sheet type is made, i.e., Yes in Step S164, the CPU 107 changes a value of the sheet type currently set to a value after the change in Step S165. At this time, the sheet type indicated in the area 804 is updated to the value after the change.

Then, when the 'OK' key 806 of the sheet setting screen 801 is pressed, i.e., Yes in Step S166, the CPU 107 stores information concerning the size and type of the sheet corresponding to the manual feed tray 52 in the EEPROM 111 and finishes the sheet information setting process.

As described above, according to the present embodiment, in the case where the type-free setting is enabled for the manual feed tray 52 when the copy job is inputted, the sheet setting screen 801 is displayed on the display 103 before the copying operation is started. This arrangement makes it possible to urge the user to input information such as the sheet size and the sheet type and to prevent an inadequate copying operation in which the size and type of the sheet are unknown from being carried out.

Third Embodiment

While a third embodiment of the present disclosure will be described next, the third embodiment is different from the first embodiment in that the preparation process of the list of sheet support portions to be retrieved in the sheet attribute setting process (see FIG. 8) and in the PDL job, i.e., Step S124 in FIG. 17. Accordingly, the same components with those of the first embodiment will not be illustrated or be described by denoting the same reference numerals.

Figure 22:
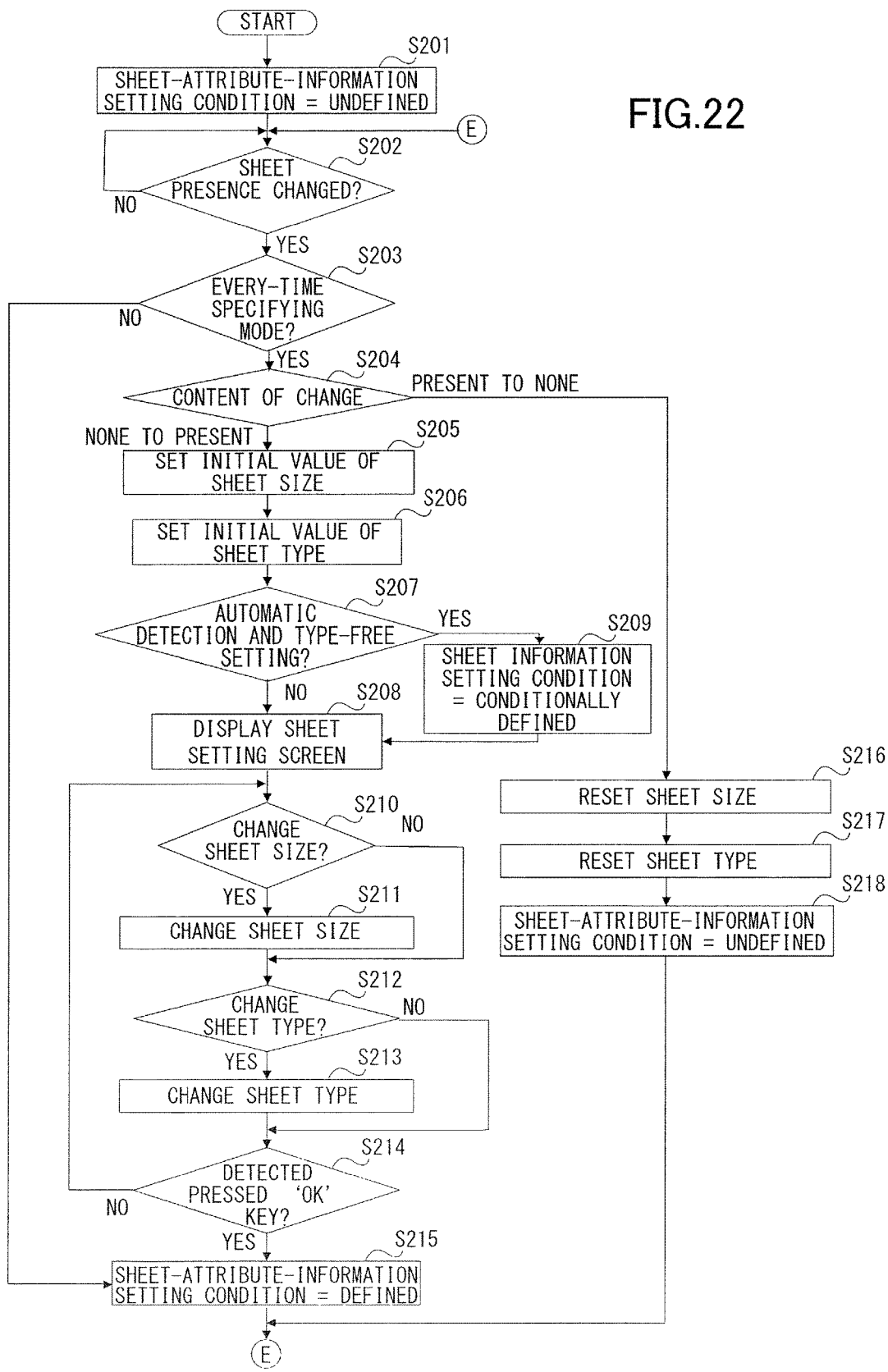
FIG. 22 is a flowchart illustrating a sheet attribute setting process of a third embodiment.

The sheet attribute setting process of the present embodiment will be described with reference to FIG. 22. The sheet attribute setting process as illustrated in FIG. 8 is what structurally executed in the condition in which the main power source of the image forming apparatus 101 is ON for example. In an initial condition, the CPU 107 sets a value of the 'sheet-attribute-information setting condition' which is a setting variable indicating whether the sheet attribute information is being defined as 'undefined' in Step S201. Then, in a case where the detection signal of the sheet detection sensor 56 (see FIG. 2B) disposed on the manual feed tray 52 changes, i.e., Yes in Step S202, the CPU 107 executes a process corresponding to the content of the change in Step S204.

Next, the CPU 107 judges whether the every-time specifying mode is set and if it is determined to be the every-time specifying mode, i.e., Yes in Step S203, the CPU 107 advances the process to Step S204. If it is determined to be the fixed mode, No in Step S203, the CPU 107 advances the process to Step S215. In a case where the change of the detection signal of the sheet detection sensor 56 in Step S204 is 'present' from 'none', i.e., None to Present in Step S204, the CPU 107 substitutes an initial value in the setting variable indicating the sheet size in Step S205. The CPU 107 substitutes an initial value also in a setting variable indicating the sheet type in Step S206.

Next, the CPU 107 judges whether the 'automatic detection' key 807 is selected in the sheet setting screen 801 and whether the type-free setting is enabled for the manual feed tray 52 in Step S207. In a case where the 'automatic detection' key 807 is selected, the size of the sheet placed on the manual feed tray 52 is automatically set corresponding to detection results of the guide width sensor 54 and the length detection sensors 57. This condition will be referred to as an 'automatic detection condition' hereinafter. In a case where the automatic detection condition and the type-free setting are enabled, i.e., Yes in Step S207, the CPU 107 sets the value of the 'sheet-attribute-information setting condition' stored in the EEPROM 111 as 'conditionally defined' in Step S209. A reason why the value is 'conditionally' defined because it is a condition in which only a tentative initial value is set for the sheet type in Step S206 although a correct value is set for the sheet size in Step S205 by the automatic detection.

In a case where the 'automatic detection condition' and the type-free setting are disabled, i.e., No in Step S207, the CPU 107 displays the sheet setting screen 801 (see FIG. 9A) on the display 103 in Step S208 without changing the value of the 'sheet-attribute-information setting condition'. In a case where an operation of changing the sheet size is made, i.e., Yes in Step S210, in the condition in which the sheet setting screen 801 is displayed, the CPU 107 changes the value of the sheet size currently set to a value after the change in Step S211. At this time, the sheet size displayed in the area 802 is updated to that of the value after the change. Still further, in a case where the operation of changing the sheet type is made, i.e., Yes in Step S212, the CPU 107 changes the sheet type currently set to that of a value after the change in Step S213. At this time, the sheet type displayed in the area 804 is updated to that of the value after the change.

Then, when the 'OK' key 806 of the sheet setting screen 801 is pressed, i.e., Yes in Step S214, the CPU 107 stores information concerning the size and type of the sheet corresponding to the manual feed tray 52 in the EEPROM 111 and finishes the sheet attribute setting process.

It is noted that as described in Step S69 in FIG. 11, according to the present embodiment, in a case where the sheet supported by the manual feed tray 52 is replaced after when the PDL job is inputted, the value of the 'sheet-attribute-information setting condition' is set as follows. That is, for the sheet replaced after the input of the PDL job, the CPU 107 controls so as not to 'conditionally define' the value of the 'sheet-attribute-information setting condition' in Step S209. It is because the printing is highly possibly executed right after when the sheet is replaced without permitting the user to have a time for confirmation. Accordingly, in such a case, the 'sheet-attribute-information setting condition' is 'defined' from 'undefined' by waiting for the 'OK' key 806 being pressed in Step S214.

In a case where the CPU 107 detects that the sheet is removed from the manual feed tray 52 in the standby condition, i.e., present to none in Step S204, the information concerning the sheet size and the information concerning the sheet type are reset in Steps S216 and S217. Then, after setting the value of the 'sheet-attribute-information setting condition' to 'undefined' in Step S218, the CPU 107 returns to the standby condition in Step S202.

Figure 23:
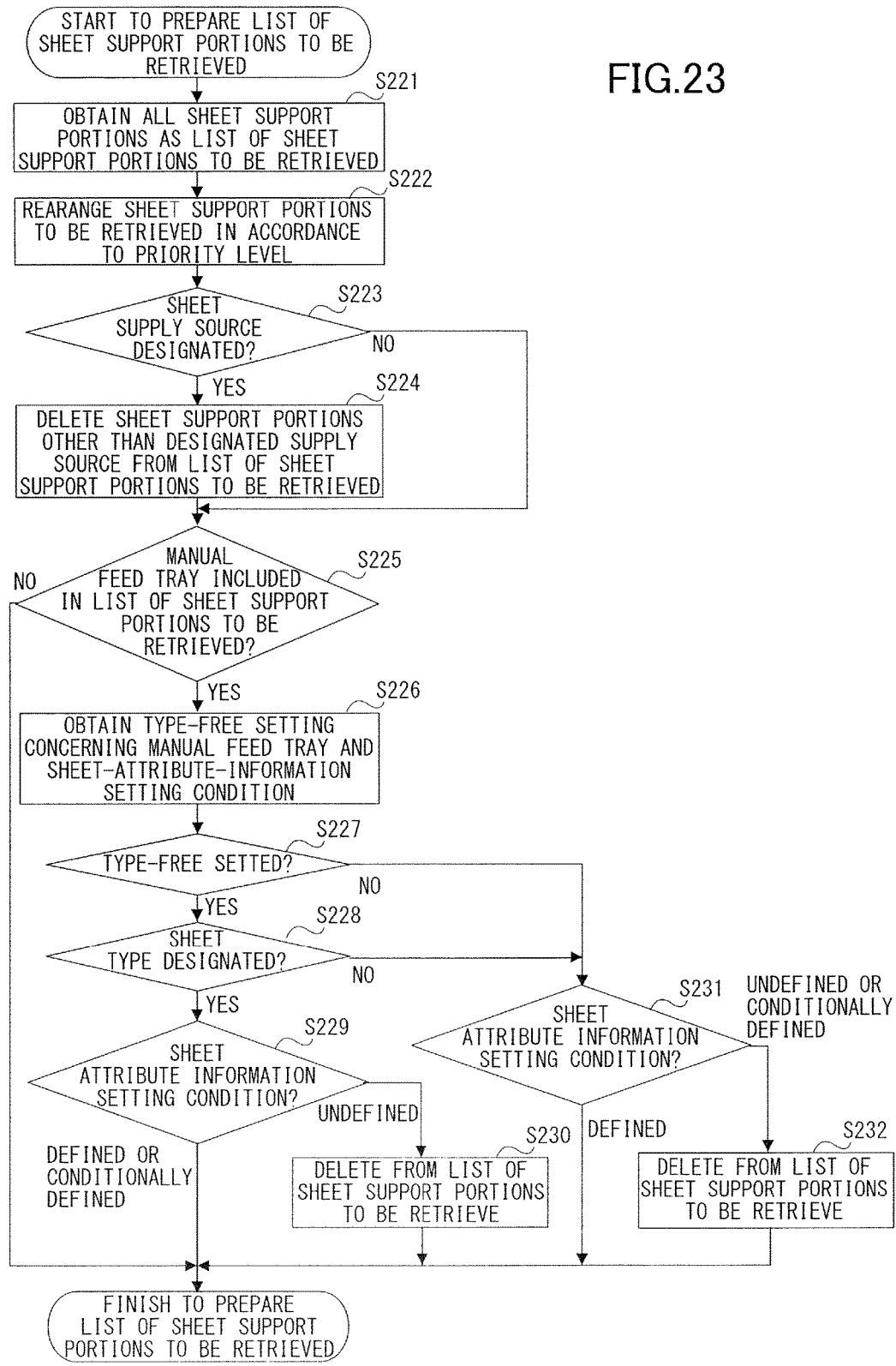
FIG. 23 is a flowchart illustrating a procedure of a process for preparing a list of sheet support portions to be retrieved as a sheet supply source of the third embodiment.

Next, a procedure of the preparation process of the list of sheet support portions to be retrieved in a PDL job of a third embodiment will be descried with reference to a flowchart in FIG. 23. It is noted that because Steps S221 through S225 are the same as Steps S71 through S75 (see FIG. 12) of the first embodiment, their description will be omitted here.

In the case where the manual feed tray 52 is included in the list of sheet support portions to be retrieved, i.e., Yes in Step S225, the CPU 107 collates the EEPROM 111 to obtain values of the type-free setting and the sheet-attribute-information setting condition for the manual feed tray 52 in Step S226. Next, the CPU 107 judges whether the type-free setting for the manual feed tray 52 is enabled or disabled. In a case of being enabled, i.e., Yes in Step S227, the CPU 107 advances the process to Step S228. In a case of being disabled, i.e., No in Step S227, the CPU 107 advances the process to Step S231. The CPU 107 also judges whether the sheet type is specified in the PDL job in Step S228.

In a case where the sheet type is specified in the PDL job, Yes in Step S228, the CPU 107 confirms the sheet-attribute-information setting condition in Step S229. In a case where the sheet-attribute-information setting condition is 'defined' or 'conditionally defined', the CPU 107 defines the list of sheet support portions to be retrieved by the content at that time and finishes to prepare the list. In a case where the sheet-attribute-information setting condition is 'undefined', the CPU 107 deletes the manual feed tray 52 out of the list of sheet support portions to be retrieved in Step S230 and finishes to prepare the lit.

Meanwhile, in a case where the type-free setting is disabled in Step S227 or also in a case where the sheet type is not specified in the PDL job, the CPU 107 confirms the sheet-attribute-information setting condition in Step S231. In case where the sheet-attribute-information setting condition is 'defined', the CPU 107 defines the list of sheet support portions to be retrieved by the content at that moment and finishes to prepare the list. In the case where the sheet-attribute-information setting condition is 'undefined' or 'conditionally defined', the CPU 107 deletes the manual feed tray 52 out of the list of sheet support portions to be retrieved in Step S232 and finishes to prepare the list.

As describe above, the user can execute printing just by placing a sheet on the manual feed tray 52, if conditions described later are met, by defining the condition of 'conditionally defined' in the sheet-attribute-information setting condition of the manual feed tray 52. Therefore, the user can carry out the printing operation of the PDL job without operating the display 103 and the operation portion 104 in printing by the PDL job. It is thus possible to reduce the operational burden of the user. Specifically, the user can execute the printing by the sheet type intended by the user even in the condition in which the sheet setting screen 801 is displayed on the display 103 in Step S208 (see FIG. 22) and the 'OK' key 806 is not selectively operated. The conditions to be met are three conditions of that the type-free setting is made for the manual feed tray 52 in advance, the sheet size is in a condition of being automatically detected, and a sheet type is specified for the PDL data. Meanwhile, it is possible to prevent a sheet type unintended by the user from being printed, because the control is made such that no printing is executed on a sheet from the sheet support portion or the manual feed tray 52 unless the sheet-attribute-information setting condition is 'defined' in a condition in which these conditions are not met. It is noted that all of the abovementioned three conditions are not always necessary. For instance, the condition of that the sheet size is in the condition of being automatically detected may be omitted. Still further, the sheet-attribute-information setting condition may be 'conditionally defined in a case where not only the type-free setting, but also the size-free setting and the driver setting priority are enabled. It is also possible to arrange such that printing can be execute in the case such setting is made even in a condition in which no selective operation is made in the sheet setting screen 801.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-207659, filed Oct. 24, 2016, which is hereby incorporated by reference wherein in its entirety.

What is claimed is:

1. An image forming apparatus, comprising:
a sheet support portion configured to support a sheet;
an image forming portion configured to form an image on the sheet fed from the sheet support portion;
a display configured to display a type setting screen on which a sheet type corresponding to the sheet support portion can be set;
a storage portion configured to store information concerning the sheet type corresponding to the sheet support portion; and
a processor configured to execute one of a plurality of modes including a first mode and a second mode in a case where an image forming job is inputted, and configured to execute one of a plurality of modes including a third mode and a fourth mode, the first mode being a mode where the processor controls the image forming portion to form an image on the sheet only if a sheet type included in the image forming job is consistent with the sheet type stored in the storage portion, the second mode being a mode where the processor is capable of controlling the image forming portion to form the image on the sheet even if the sheet type included in the image forming job is inconsistent with the sheet type stored in the storage portion, the third mode being a mode where the processor displays the type setting screen on the display at a time when the sheet is supported on the sheet support portion, and the fourth mode being a mode where the processor does not display the type setting screen on the display even if the sheet is supported on the sheet support portion,
wherein the processor controls, in a condition in which the processor is set in the third mode, the display so as not to display the type setting screen at the time the sheet is supported on the sheet support portion in the second mode.

2. The image forming apparatus according to claim 1, wherein the sheet support portion is a tray through which a sheet can be manually fed.

3. An image forming apparatus, comprising:
a sheet support portion configured to support a sheet;
an image forming portion configured to form an image on the sheet fed from the sheet support portion;
a storage portion configured to store information concerning a sheet type corresponding to the sheet support portion;
a display configured to display a type setting screen on which the sheet type corresponding to the sheet support portion can be set and configured to set the sheet type corresponding to the sheet support portion through a selection operation made on the type setting screen; and
a processor configured to execute one of a plurality of modes including a first mode and a second mode in a case where an image forming job is inputted, and configured to execute one of a plurality of modes including a third mode and a fourth mode, the first mode being a mode where the processor controls the image forming portion to form an image on the sheet only if a sheet type included in the image forming job is consistent with the sheet type stored in the storage portion, the second mode being a mode where the processor is capable of controlling the image forming portion to form the image on the sheet even if the sheet type included in the image forming job is inconsistent with the sheet type stored in the storage portion, the third mode being a mode where the processor displays the type setting screen on the display at a time when the sheet is supported on the sheet support portion, and the fourth mode being a mode where the processor does not display the type setting screen on the display even if the sheet is supported on the sheet support portion, wherein the processor controls, in a condition in which the processor is set in the second and third modes, the image forming portion so as to form the image on the sheet in a case where an image forming job including a sheet type is inputted even if no selective operation is made on the display.

4. The image forming apparatus according to claim 3, wherein the processor controls the image forming portion so as to form the image on the sheet in a case where the sheet is supported on the sheet support portion after an input of the image forming job and where the sheet type specified by the image forming job is consistent with the sheet type stored in the storage portion through the selective operation made on the type setting screen.

5. The image forming apparatus according to claim 3, wherein the sheet support portion is a tray through which a sheet can be manually fed.

* * * * *